United States Patent
Tomioka et al.

(10) Patent No.: US 11,144,786 B2
(45) Date of Patent: Oct. 12, 2021

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventors: Makoto Tomioka, Kawasaki (JP); Daisuke Kotake, Yokohama (JP); Nozomu Kasuya, Yokohama (JP); Masahiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 16/174,458

(22) Filed: Oct. 30, 2018

(65) Prior Publication Data

US 2019/0130216 A1 May 2, 2019

(30) Foreign Application Priority Data

Nov. 2, 2017 (JP) .............................. JP2017-213226
Aug. 14, 2018 (JP) .............................. JP2018-152718

(51) Int. Cl.
*G06K 9/62* (2006.01)
*G06K 9/52* (2006.01)
(Continued)

(52) U.S. Cl.
CPC ......... *G06K 9/6256* (2013.01); *G06K 9/3208* (2013.01); *G06K 9/52* (2013.01);
(Continued)

(58) Field of Classification Search
CPC ...... G06K 9/6256; G06K 9/3208; G06K 9/52; G06K 9/626; G06K 9/6267; G06N 20/20; G06N 20/00; G06T 7/70; G06T 19/006
See application file for complete search history.

(56) References Cited

U.S. PATENT DOCUMENTS

2015/0292863 A1 10/2015 Furihata et al.
2016/0180195 A1* 6/2016 Martinson ............ G06K 9/6202
382/103

(Continued)

OTHER PUBLICATIONS

K. Tateno, F. Tombari, I. Laina and N. Navab, "CNN-SLAM: Real-time dense monocular SLAM with learned depth prediction," IEEE Computer Society Conference on Computer Vision and Pattern Recognition (CVPR), 2017; 10 pp.

(Continued)

*Primary Examiner* — Yuwen Pan
*Assistant Examiner* — Umair Ahsan
(74) *Attorney, Agent, or Firm* — Carter, DeLuca & Farrell LLP

(57) ABSTRACT

An information processing apparatus comprising: a holding unit configured to hold a plurality of learning models for estimating geometric information based on an input image captured by an image capturing apparatus; a selection unit configured to calculate, for each of the learning models, an evaluation value that indicates suitability of the learning model to a scene of the input image, and select a learning model from the plurality of learning models based on the evaluation values; and an estimation unit configured to estimate first geometric information using the input image and the selected learning model.

16 Claims, 11 Drawing Sheets

(51) Int. Cl.
*G06N 20/20* (2019.01)
*G06N 20/00* (2019.01)
*G06K 9/32* (2006.01)

(52) U.S. Cl.
CPC .......... *G06K 9/626* (2013.01); *G06K 9/6267* (2013.01); *G06N 20/20* (2019.01); *G06N 20/00* (2019.01)

(56) References Cited

U.S. PATENT DOCUMENTS

| | | |
|---|---|---|
| 2016/0260027 A1 | 9/2016 | Kuwabara et al. |
| 2017/0206676 A1 | 7/2017 | Nakazato et al. |
| 2017/0220887 A1* | 8/2017 | Fathi .................. G06K 9/00201 |
| 2017/0236301 A1 | 8/2017 | Kobayashi et al. |
| 2017/0278014 A1* | 9/2017 | Lessmann ............ G06K 9/6267 |
| 2017/0372466 A1 | 12/2017 | Hirota et al. |
| 2018/0139431 A1* | 5/2018 | Simek .................. H04N 13/254 |
| 2018/0204061 A1* | 7/2018 | Antol ...................... G06T 11/00 |
| 2018/0260531 A1* | 9/2018 | Nori ........................ G06N 20/00 |
| 2018/0349785 A1* | 12/2018 | Zheng ...................... G06N 3/08 |

OTHER PUBLICATIONS

Z. Zhang, "A Flexible New Technique for Camera Calibration," IEEE Transactions on Pattern Analysis and Machine Intelligence, vol. 22, No. 11, Nov. 2000; pp. 1330-1334.

J. Engel, T. Schöps, and D. Cremers, "LSD-SLAM: Large-Scale Direct Monocular SLAM," In European Conference on Computer Vision (ECCV), 2014; 16 pp.

J. Long, E. Shelhamer and T. Darrell, "Fully Convolutional Networks for Semantic Segmentation," Transaction on Pattern Analysis and Machine Intelligence (PAMI), vol. 39, 2017; 10 pp.

A. Kendall, M. Grimes and R. Cipolla, "PoseNet: A Convolutional Network for Real-Time 6-DOF Camera Relocalization", International Conference on Computer Vision (ICCV), 2015; pp. 2938-2946.

S. Hinterstoisser, S. Holzer, C. Cagniart, S. Ilic, K. Konolige, N. Navab and V. Lepetit, "Multimodal Templates for Real-Time Detection of Texture-less Objects in Heavily Cluttered Scenes," In European Conference on Computer Vision (ECCV), 2011; 8 pp.

* cited by examiner

| CNN Model | Train image |
|---|---|
| model001.cnn | model001/image001.png<br>model001/image002.png<br>... |
| model001.cnn | model002/image001.png<br>model002/image002.png<br>... |
| model003.cnn | model003/image001.png<br>model003/image002.png<br>... |
| ... | ... |

US 11,144,786 B2

INFORMATION PROCESSING APPARATUS, METHOD FOR CONTROLLING INFORMATION PROCESSING APPARATUS, AND STORAGE MEDIUM

BACKGROUND OF THE INVENTION

Field of the Invention

The present invention relates to an information processing apparatus, a method for controlling an information processing apparatus, and a storage medium.

Description of the Related Art

Measurement of the position and orientation of an image capturing apparatus based on image information are used for various purposes such as alignment of a virtual object with a real space in mixed reality/augmented reality, estimation of the self-location of a robot or an automobile, and three-dimensional modeling of an object or a space.

K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017 discloses a method in which a learning model trained in advance is used to estimate geometric information (depth information), which serves as an index for calculating position and orientation from an image, and position and orientation are calculated based on the estimated depth information.

The disclosure of K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017 relies on the assumption that a scene of a captured training image used in training of the learning model and a scene of an input image captured by an image capturing apparatus are similar to each other. Accordingly, there is demand for a solution for improving the accuracy of estimation of geometric information even if the scenes are not similar to each other.

The present invention was made in view of the aforementioned problems and provides a technique for obtaining position and orientation accurately.

SUMMARY OF THE INVENTION

According to one aspect of the present invention, there is provided an information processing apparatus comprising: a holding unit configured to hold a plurality of learning models for estimating geometric information based on an input image captured by an image capturing apparatus; a selection unit configured to calculate, for each of the learning models, an evaluation value that indicates suitability of the learning model to a scene of the input image, and select a learning model from the plurality of learning models based on the evaluation values; and an estimation unit configured to estimate first geometric information using the input image and the selected learning model.

Further features of the present invention will become apparent from the following description of exemplary embodiments with reference to the attached drawings.

DESCRIPTION OF THE EMBODIMENTS

Figure 1:
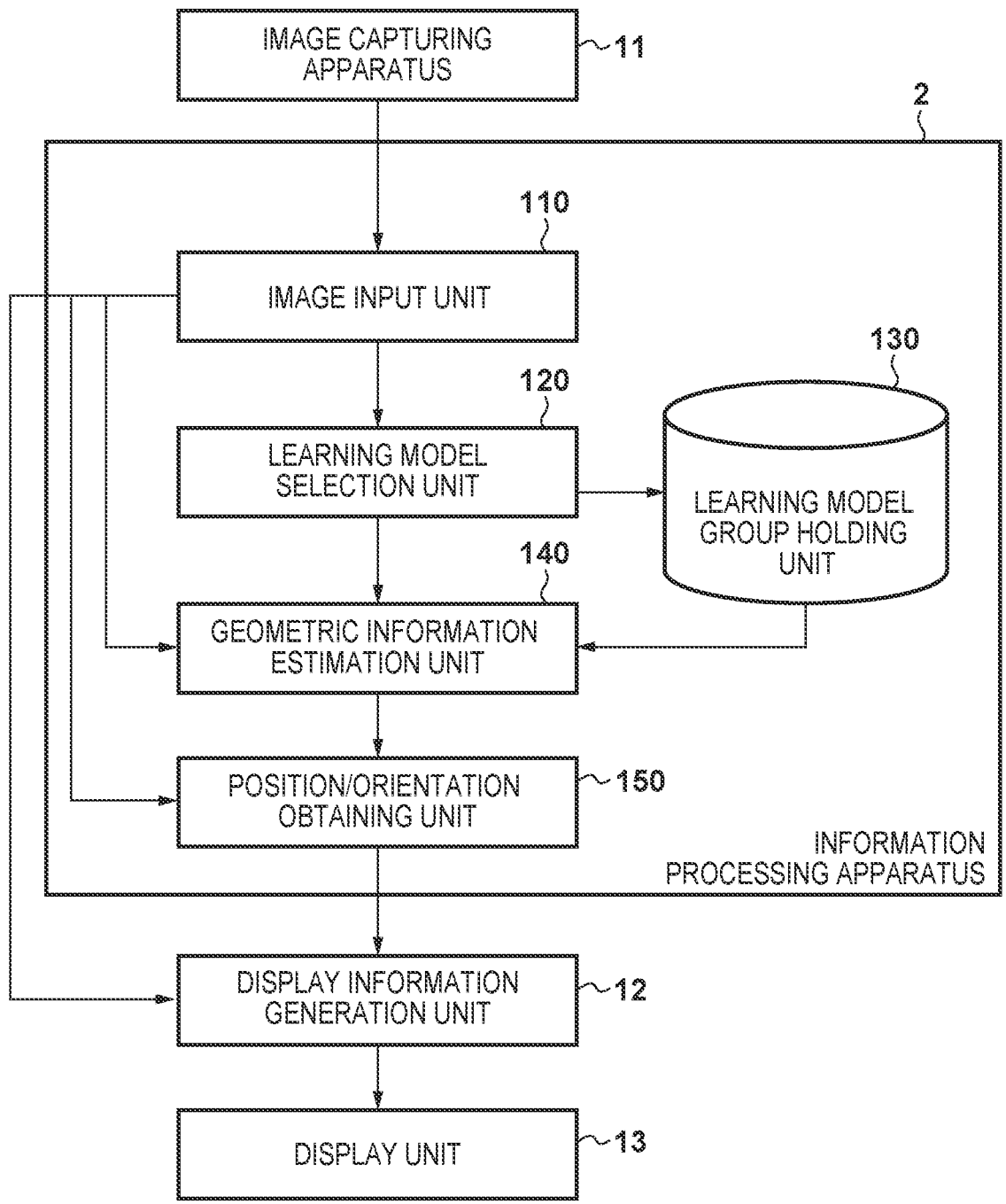
FIG. 1 is a diagram illustrating a functional configuration of an information processing apparatus 1 according to Embodiment 1.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

The present embodiment will describe a case where the present invention is applied to aligning a virtual object with a real space in a mixed reality system, that is, a case where the present invention is applied to measuring the position and orientation of an image capturing apparatus in the real space that are to be used in rendering the virtual object. When experiencing mixed reality, a user has in hand a mobile terminal such as a smartphone or a tablet, and observes, through the display of the mobile terminal, a real space on which a virtual object is superimposed. In the present embodiment, the mobile terminal is provided with a monocular RGB camera, which serves as the image capturing apparatus, and the user views an image that is captured by the camera and on which a CG image of the virtual object is superimposed, the CG image being rendered based on the position and orientation of the camera in the real space.

For the calculation of the position and orientation of the image capturing apparatus, geometric information is used that is estimated by a learning model based on an input image captured by the image capturing apparatus. In the present embodiment, "geometric information that is estimated by the learning model" refers to a depth map, which contains depth information estimated for each pixel of the input image. Furthermore, the learning model is assumed to be a Convolutional Neural Network (CNN). Specifically, an image is captured at a time t (hereinafter referred to as "current frame"), and depth information (hereinafter, referred to as "previous depth map") is estimated by the learning model using an image captured at a time t' prior to the current frame (hereinafter referred to as "previous frame") as an input, and based thereon, pixels of the previous frame are projected onto the current frame. In this context, "projection" means to calculate the positions in the current frame at which the pixels of the previous frame are to appear. Specifically, the three-dimensional coordinates $(X_{t-1}, Y_{t-1}, Z_{t-1})$, in the camera coordinate system of the previous frame, of each pixel of the previous frame are calculated using Formula 1, where $(u_{t-1}, v_{t-1})$ are image coordinates of this pixel of the previous frame, $(f_x, f_y, c_x, c_y)$ are internal parameters of the camera, and D is a depth value of pixels of the previous depth map.

[Formula 1]

$$\begin{bmatrix} X_{t-1} \\ Y_{t-1} \\ Z_{t-1} \end{bmatrix} = D \begin{bmatrix} (u_{t-1} - c_x)/f_x \\ (v_{t-1} - c_y)/f_y \\ 1 \end{bmatrix} \quad (1)$$

Then, the three-dimensional coordinates $(X_t, Y_t, Z_t)$, in the camera coordinate system of the current frame, of this feature point are calculated using Formula 2, where $t_{(t-1) \to t}$ and $R_{(t-1) \to t}$ are the position and orientation of the camera at which the current frame is captured with respect to the position of the camera at which the previous frame was captured.

[Formula 2]

$$\begin{bmatrix} X_t \\ Y_t \\ Z_t \\ 1 \end{bmatrix} = \begin{bmatrix} R_{(t-1) \to t} & t_{(t-1) \to t} \\ 0 & 1 \end{bmatrix} \begin{bmatrix} X_{t-1} \\ Y_{t-1} \\ Z_{t-1} \\ 1 \end{bmatrix} \quad (2)$$

Then, the three-dimensional coordinates $(X_t, Y_t, Z_t)$, in the camera coordinate system of the current frame, of this feature point is converted into the image coordinates $(u_t, v_t)$ of the current frame using Formula 3.

[Formula 3]

$$\begin{bmatrix} u_t \\ v_t \end{bmatrix} = \begin{bmatrix} f_x X_t / Z_t + c_x \\ f_y Y_t / Z_t + c_y \end{bmatrix} \quad (3)$$

In the present embodiment, processing from Formulae 1 to 3 is referred to as "projection". The position and orientation $t_{(t-1) \to t}$ and $R_{(t-1) \to t}$ are calculated so that a difference in brightness between the pixel $(u_{t-1}, v_{t-1})$ of the previous frame and the pixel $(u_t, v_t)$ of the current frame, which is the projection destination, is minimum. Lastly, the position and orientation $t_{w \to t}$ and $R_{w \to t}$, in the world coordinate system, of the camera at which the current frame is captured are calculated using Formula 4, where $t_{w \to (t-1)}$ and $R_{w \to (t-1)}$ are the position and orientation, in the world coordinate system, of the camera at which the previous frame was captured.

[Formula 4]

$$\begin{bmatrix} R_{w \to t} & t_{w \to t} \\ 0 & 1 \end{bmatrix} = \begin{bmatrix} R_{(t-1) \to t} & t_{(t-1) \to t} \\ 0 & 1 \end{bmatrix} \begin{bmatrix} R_{w \to (t-1)} & t_{w \to (t-1)} \\ 0 & 1 \end{bmatrix} \quad (4)$$

Learning models are trained in advance so as to be able to estimate, upon input of an image, the corresponding depth map based on a plurality of images and a plurality of depth maps obtained by capturing the same field of view at the same time. For example, if a learning model trained with a training image of an indoor scene is used, a depth map can be estimated accurately upon input of an indoor image. However, if an outdoor image is input to this learning model, the depth map to be output will have reduced accuracy. Accordingly, the present embodiment will describe, as a method for selecting a learning model that can accurately calculate geometric information of the captured scene of an input image from among a plurality of learning models trained with respective scenes, a method for selecting a learning model whose training image is similar to the input image. "Scene" refers to, for example, an indoor scene, an outdoor scene, a scene of a room of a Japanese-style house, a scene of a room of a Western-style house, a scene of an office, a scene of a factory, or the like.

In the present embodiment, "the position and orientation of the image capturing apparatus" refer to six parameters in the world coordinate system defined in a real space, the six parameters including three parameters indicating the position of the camera and three parameters indicating the orientation of the camera. In the present embodiment, unless otherwise noted, "the position and orientation of the camera" are referred to also as position/orientation of the camera. Furthermore, "camera coordinate system" refers to the three-dimensional coordinate system that is defined on the camera, and in which the Z axis indicates the optical axis of the camera, the X axis indicates the horizontal direction of the image, and the Y axis indicates the vertical direction thereof.

Configuration of Information Processing Apparatus

FIG. 1 is a diagram showing an example of a functional configuration of an information processing apparatus 1 according to the present embodiment. The information processing apparatus 1 is provided with an image input unit 110, a learning model selection unit 120, a learning model group holding unit 130, a geometric information estimation unit 140, and a position/orientation obtaining unit 150. The image input unit 110 is connected to an image capturing apparatus 11 and a display information generation unit 12 that are installed in a mobile terminal. The position/orientation obtaining unit 150 is connected to the display information generation unit 12. The display information generation unit 12 is connected to a display unit 13. Note however that FIG. 1 shows an example of a device configuration and does not limit the scope of application of the present invention. In the example of FIG. 1, the display information generation unit 12 and the display unit 13 are provided outside the information processing apparatus 1 but may also be provided inside the information processing apparatus 1. Furthermore, a configuration is also possible in which the display information generation unit 12 is provided inside the information processing apparatus 1, and the display unit 13 is an external device of the information processing apparatus 1.

The image input unit 110 receives image data of a two-dimensional image of a scene captured by the image capturing apparatus 11 in a time series manner (for example, 60 frames per second), and outputs the image data to the learning model selection unit 120, the geometric information estimation unit 140, the position/orientation obtaining unit 150, and the display information generation unit 12.

The learning model selection unit 120 selects, based on the input image input through the image input unit 110, one of learning models held by the learning model group holding unit 130, and outputs the selection result to the geometric information estimation unit 140.

The learning model group holding unit 130 holds a plurality of learning models. The data structure thereof will be described in detail later. The geometric information estimation unit 140 inputs, to the learning model selected by the learning model selection unit 120, the input image input through the image input unit 110, and estimates geometric information. Furthermore, the geometric information estimation unit 140 outputs the estimated geometric information to the position/orientation obtaining unit 150.

The position/orientation obtaining unit 150 calculates and obtains the position and orientation of the image capturing apparatus, based on the input image input through the image input unit 110 and the geometric information input by the geometric information estimation unit 140. Then, the position/orientation obtaining unit 150 outputs information indicating the obtained position and orientation to the display information generation unit 12.

The display information generation unit 12 renders a CG image of a virtual object, using the position and orientation obtained from the position/orientation obtaining unit 150 and inner and outer parameters of the camera that are held by a not-shown holding unit. Then, the display information generation unit 12 generates a combined image in which the CG image is superimposed on the input image input through the image input unit 110. The combined image is output to the display unit 13. The display unit 13 is the display of the mobile terminal and is configured to display the combined image generated by the display information generation unit 12.

Figures 2, 3:
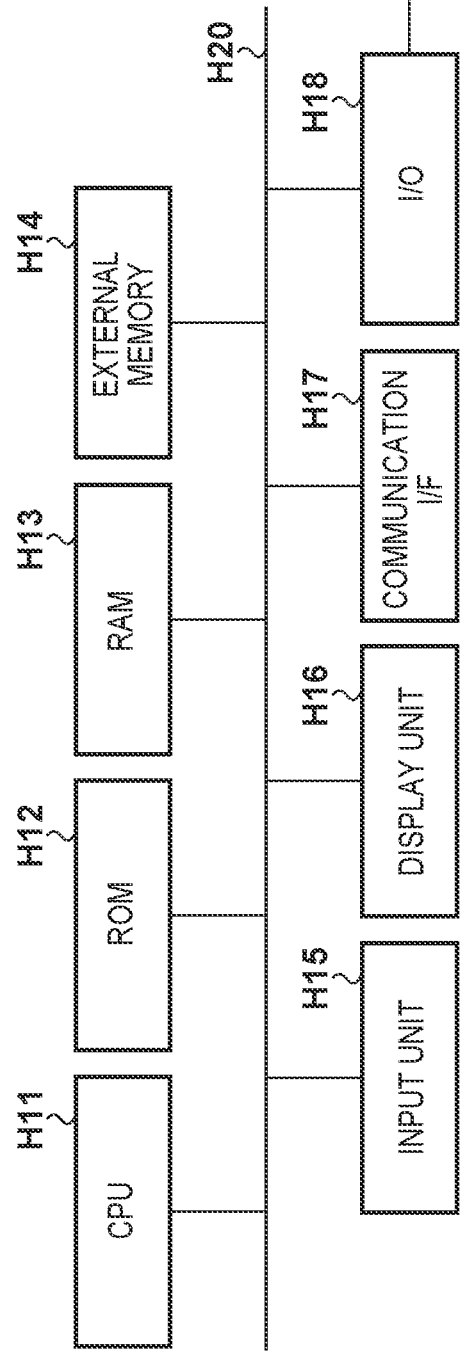
FIG. 2 is a diagram illustrating a data structure of a learning model group holding unit according to Embodiment 1.
FIG. 3 is a diagram illustrating a hardware configuration of the information processing apparatus 1 of Embodiment 1.

FIG. 2 is a diagram showing the data structure of the learning model group holding unit 130. In the present embodiment, at least two learning models are held. Also, it is assumed that, for each learning model, at least one training image is held that is used in training of the learning model. The learning model is assumed to be a data file in which, for example, an identifier of the CNN (Convolutional Neural Network) is held in a binary form.

FIG. 3 is a diagram showing a hardware configuration of the information processing apparatus 1. H11 is a CPU, and performs control on various devices connected to a system bus H20. H12 is a ROM, and stores a BIOS (Basic Input/Output System) program and boot programs. H13 is a RAM, and is used as a main memory device of the H11, which is a CPU. H14 is an external memory, and stores programs that are processed by the information processing apparatus 1. An input unit H15 is a keyboard, a mouse, or a robot controller, and performs processing relating to input of information or the like. A display unit H16 outputs calculation results of the information processing apparatus 1 to a display device in accordance with an instruction given from the H11. Note that the display device may be of any type, and may be a liquid crystal display device, a projector, a LED indicator, or the like. Furthermore, the display device may be the display unit 13. H17 is a communication interface, which performs information communication via a network, and may be of any type, such as an Ethernet (Registered Trademark) communication interface, a USB communication interface, a serial communication interface, or a wireless communication interface. H18 is an input/output unit (I/O) and is connected to a camera H19. Note that the camera H19 corresponds to the image capturing apparatus 11.

Processing

Figure 4:
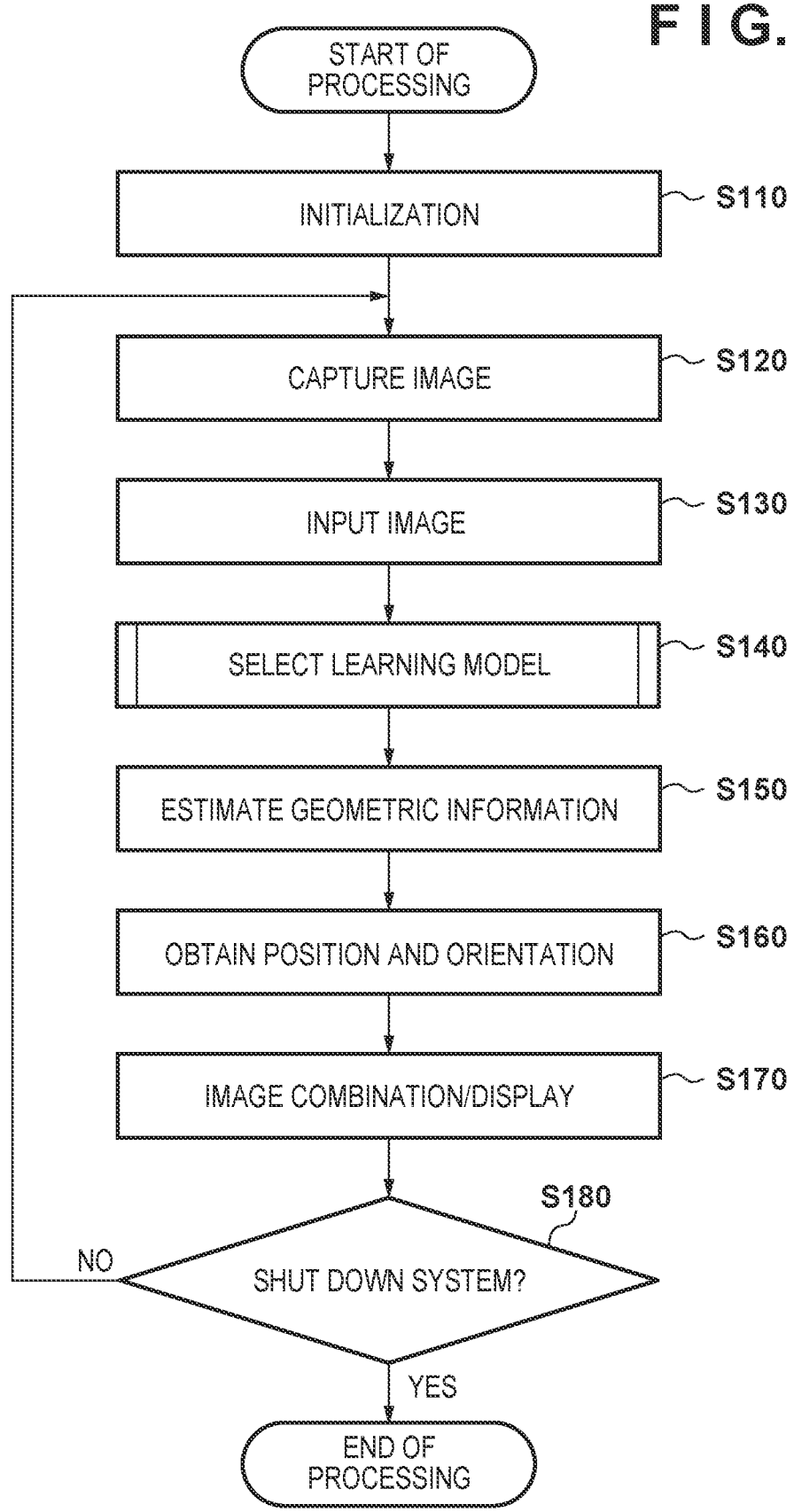
FIG. 4 is a flowchart illustrating a processing procedure of Embodiment 1.

The following will describe a processing procedure according to the present embodiment. FIG. 4 is a flowchart showing a procedure of processing that is executed by an information processing system that includes the information processing apparatus 1 of the present embodiment.

In step S110, the system is initialized. In other words, a program is read from the external memory H14, and the information processing apparatus 1 enters an operable state. Furthermore, parameters of devices (such as the image capturing apparatus 11) connected to the information processing apparatus 1, and the initial position and orientation of the image capturing apparatus 11 are read. The internal parameters of the image capturing apparatus 11 (such as focal lengths $f_x$ (horizontal direction of an image) and $f_y$ (vertical direction of the image), central positions $c_x$ (horizontal direction of the image) and $c_y$ (vertical direction of the image) of the image, and a lens distortion parameter) are calibrated in advance using the method of Zhang described in Z. Zhang, "A Flexible New Technique for Camera Calibration," IEEE Trans. on Pattern Analysis and Machine Intelligence, vol. 22, no. 11, pp. 1330-1334, 2000.

In step S120, the image capturing apparatus 11 captures a scene, and outputs the captured scene to the image input unit 110.

In step S130, the image input unit 110 acquires, as an input image, an image including the scene captured by the image capturing apparatus 11. Note that, in the present embodiment, the input image is an RGB image.

In step S140, the learning model selection unit 120 calculates evaluation values of the learning models using the training images held by the learning model group holding unit 130, and selects a learning model based on the calculated evaluation values. The evaluation value calculation processing in step S140 will be described in detail later with reference to FIGS. 5 and 6.

In step S150, the geometric information estimation unit 140 estimates geometric information based on the learning model selected in step S140. Specifically, the learning model selection unit 120 inputs the input image to the learning model, and estimates a depth map, which serves as the geometric information. In the present embodiment, an image of a previous frame is input to the learning model, and a previous depth map is estimated.

In step S160, the position/orientation obtaining unit 150 calculates and obtains the position and orientation of the image capturing apparatus 11, based on the geometric information (depth map) calculated in step S150. Specifically, first, pixels of the previous frame are projected onto the current frame based on the depth map estimated using the learning model. Then, the position and orientation are calculated so that differences in brightness between the pixel values of the projected pixels of the previous frame and the pixel values of the current frame are minimum, using the method of Engel (J. Engel, T. Schöps, and D. Cremers, "LSD-SLAM: Large-Scale Direct Monocular SLAM," In European Conference on Computer Vision (ECCV), 2014).

In step S170, the display information generation unit 12 renders a CG image of a virtual object based on the position and orientation of the image capturing apparatus 11 that were calculated in step S160, generates a combined image in which the CG image is superimposed on the input image, and inputs the generated combined image to the display unit 13. Furthermore, the display unit 13 displays the combined image on the display unit, which is the display of the mobile device.

In step S180, it is determined whether or not to shut down the system. Specifically, if a shutdown command has been input by a user through a not-shown input unit, the system is shut down, and otherwise, the processing returns to step S120 and continues.

Learning Model Selection Processing

Figure 5:
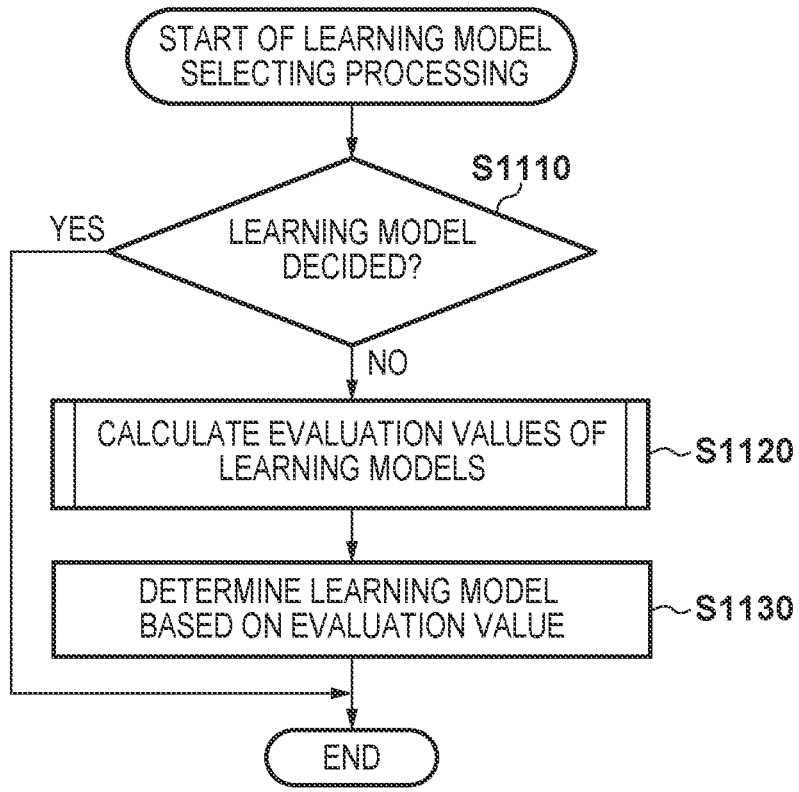
FIG. 5 is a flowchart illustrating a processing procedure of step S140 of Embodiment 1

FIG. 5 is a flowchart showing a procedure of the learning model selection processing in step S140 of the present embodiment.

In step S1110, it is determined whether or not the learning model selection unit 120 has decided which of the learning models held by the learning model group holding unit 130 is to be used. If the learning model to be used has not been decided, the procedure moves to step S1120. On the other hand, if the learning model to be used has been decided, the processing ends.

In step S1120, the learning model selection unit 120 performs a similarity search between the input image and the training images to calculate evaluation values of the learning models held by the learning model group holding unit 130. An evaluation value refers to a similarity between an input image captured by the image capturing apparatus 11 and a training image, and represents the suitability of the corresponding learning model to the scene captured by the image capturing apparatus. In the present embodiment, an evaluation value is a continuous value from 0 to 1, and the higher the fit is, the closer the evaluation value is to 1. The evaluation value calculation processing will be described in detail later with reference to FIG. 6.

In step S1130, the learning model selection unit 120 selects the learning model that includes the training image for which the largest evaluation value was calculated in step S1120. Here, by reading this learning model into, for example, a memory unit such as H13, which is a RAM, a state is realized in which the geometric information estimation unit 140 can estimate geometric information.

Evaluation Value Calculation Processing

Figure 6:
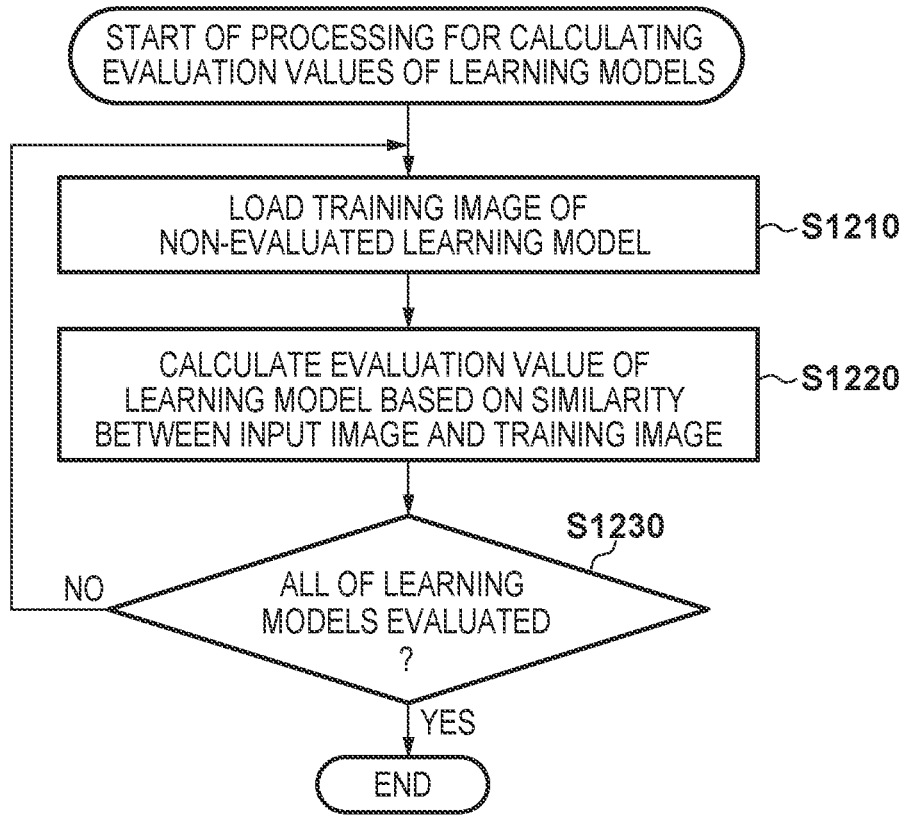
FIG. 6 is a flowchart illustrating a processing procedure of step S1120 in Embodiment 1.

FIG. 6 is a flowchart showing a detailed procedure of the processing for calculating evaluation values of the learning models in step S1120 of the present embodiment.

In step S1210, the learning model selection unit 120 loads, from the learning model group holding unit 130, a training image used in training of a learning model for which an evaluation value has not yet been calculated onto the H13, which is a RAM.

In step S1220, the learning model selection unit 120 calculates an evaluation value of the learning model based on the similarity between the input image and the training image. The present embodiment employs the pHash method, in which an image is reduced, brightness information of the image is subjected to a discrete cosine transform, and a hash value of a low-frequency component is calculated. First, the learning model selection unit 120 calculates the hash values of the input image and the training image, and calculates the Hamming distance between them. In the present embodiment, the similarity between the input image and the learning model refers to the Hamming distance. Based on the maximum value of the calculated Hamming distances of each model, the continuous value obtained by normalizing the Hamming distance of the model from 0 to 1 is calculated. In the present embodiment, normalized values are used as evaluation values of the learning models.

In step S1230, the learning model selection unit 120 determines whether or not evaluation values of all of the learning models were calculated. If the calculation of all of evaluation values is complete, the procedure ends. On the other hand, if there is any learning model for which an evaluation value has not yet been calculated, the procedure returns to step S1210. Note however that it is not necessary to evaluate all of the learning models held by the learning model group holding unit 130, and a configuration is also possible in which the evaluation values of only upper N (N is an integer) learning models in descending order of use frequency are calculated. In such a case, in step S1230, it is determined whether or not evaluation of the top N learning models is complete.

Effects

As described above, in Embodiment 1, evaluation values of a plurality of learning models are calculated, and the learning model that has the highest evaluation value is selected. Here, the similarities between an input image and the training images used in training of the learning models are calculated, and a higher evaluation value is given to a learning model if it has a higher similarity. Then, the learning model having the highest evaluation value is used to estimate geometric information, and based thereon, the position and orientation of the image capturing apparatus is calculated. By selecting a learning model whose training image is similar to the input image in this way, the learning model can accurately estimate geometric information. Accordingly, when, for example, the estimated geometric information is used to obtain the position and orientation of the image capturing apparatus, it is possible to accurately calculate the position and orientation of the image capturing apparatus. Note that examples of other usages of the estimated geometric information include later-described image recognition in automated driving of an automobile, and the like.

Furthermore, by selecting and using small learning models trained with individual scenes, estimation of geometric information is possible also in a calculating machine having a small memory capacity. Accordingly, also in a mobile terminal, it is possible to calculate the position and orientation of the image capturing apparatus.

Furthermore, by selecting and using small learning models trained with individual scenes, estimation of geometric information is possible in a shorter execution time compared to a case where a large learning model is used. Accordingly, it is possible to calculate the position and orientation of the image capturing apparatus in a short time period.

Modification

In Embodiment 1, the learning model group holding unit 130 holds training images used in training of learning models. However, the images that are held are not limited to the training images itself, and may be of any type as long as they can characterize the learning models. For example, an image that is obtained by reducing each training image or by cutting off part of the training image, or an image that is similar to the training image may also be held.

In Embodiment 1, the pHash method is used as the learning model evaluation method. However, the evaluation method is not limited to the pHash method, and any method may be used as long as the similarity between a training image used in training of a learning model and an input image can be calculated. Specifically, the similarity between colored histograms calculated from the input image and the training image may be used. Alternatively, Hog (Histogram of Oriented Gradients) feature amounts, in which gradient directions in the brightness of local regions of the input image and the training image are shown in histograms, may be calculated, and the similarity between the Hog feature amounts may be used. Alternatively, the similarity between GIST features, in which the screen is divided into small regions and a plurality of Gabor filters of directions/frequencies are applied to the small regions to obtain their responses serving as feature amounts, may be used.

Furthermore, the number of similarities between feature amounts of local features detected from the input image and feature amounts of the training images may also be used as evaluation values. As the local features, for example, SIFT feature points may be used in which gradient direction histograms in local regions of smoothed images are used as feature amounts. Alternatively, ORB feature points may also be used in which binary codes are generated based on the magnitudes of brightness at two points within local image regions, and are used as feature amounts. Furthermore, the local features may be image feature amounts that are obtained by calculating, using the Harris corner detection method, characteristic positions such as corners in an image, and setting surrounding color information as feature amounts, or templates of surrounding small regions may be used as feature amounts. Furthermore, information relating to a character detected through character recognition may be used as local features. A plurality of types of image features may also be combined.

Furthermore, the similarities of Bag-of-Visual Words converted into histograms using vector quantization of local features may be used as evaluation values. Furthermore, Bag-of-Visual Words are calculated in advance from training images of learning models, and an identifier using an SVN (support vector machine) that calculates an identification boundary that has the largest distance to feature spaces in which the respective feature amounts are present may be used. At this time, a count can be given to the learning model identified by the SVN using the feature amount calculated from the input image as an input, and it is possible to select the learning model that has the largest number of counts. It is also possible to select the learning model that corresponds to an output label obtained when an input image is input to the neural network proposed by Shelhamer, which is trained in advance so as to output the labels that correspond to the respective learning models based on training images of models (J. Long, E. Shelhamer and T. Darrell, "Fully Convolutional Networks for Semantic Segmentation", Transaction on Pattern Analysis and Machine Intelligence (PAMI), Vol. 39, pp. 640-651, 2017).

The number of input images is not limited to one, and a plurality of input images may also be used, in which a sum, a maximum value, a minimum value, an average value, or a median value of similarities between each input image and a training image may be used as an evaluation value.

In Embodiment 1, the learning model group holding unit 130 holds training images, and hash values and feature amounts are calculated at the time of calculation of evaluation values. However, hash values and feature amounts may also be calculated in advance from the training images, and the learning model group holding unit 130 may hold them. With this measure, the hash value and the feature amount do not need to be calculated from the training images when a learning model is selected, and thus selection of a learning model can be completed within a short time period.

In Embodiment 1, each of the learning models held by the learning model group holding unit 130 is a data file in which an identifier is output in a binary form. However, the learning models may each be held as a data file in which a CNN network structure and weight are output, as long as they are held in a form such that the geometric information estimation unit 140 can estimate geometric information. Alternatively, a network structure may be determined in advance, and the learning models may each be held as a data file in which only weight is extracted and output. By extracting only weight, it is possible to reduce the size of a data file compared to a case where the identifier itself is output in a binary form.

In Embodiment 1, evaluation values are calculated based on the similarities between training images and an input image. However, any evaluation value calculation method may be used as long as a higher evaluation value can be given when the captured scenes of a training image and the input image are similar to each other. For example, respective pieces of scene information relating to the captured scenes of a training image and the input image are detected, and an evaluation value is calculated based on the degree of match between the pieces of scene information. "Scene information" refers to a category of scene such as an indoor scene, an outdoor scene, sea coast, mountain, or a road. For the detection of scene information, a scene determination learning model for determining the category of the scene is used. For example, the scene determination learning model is a neural network that is trained using Deep Learning so as to output 1 if the input image falls under this category, and otherwise output 0. Furthermore, a plurality of local features may be detected from one image, and GLC features, in which an average and a correlation value of the feature amounts thereof are listed, may be calculated. Then, the category of the scene may be determined using an SVN (support vector machine) that calculates an identification boundary at which the distance between feature spaces in which the GLC features of the categories are present is maximum. Note that "GLC" is an abbreviation of "generalized local correlation".

In Embodiment 1, pixels of a previous frame are projected onto a current frame based on a depth map estimated by the geometric information estimation unit 140 using a learning model, and the position and orientation of the image capturing apparatus are calculated so that differences in brightness between the pixel values of the projected pixels of the previous frame and the pixel values of the current frame are minimum. However, any method may be used as long as position and orientation are obtained based on an output of a learning model. For example, the geometric information estimation unit uses a learning model to estimate a depth map between a previous frame and a current frame. Then, calculation of position and orientation is performed using the ICP method, in which position and orientation are calculated repeatedly so that the distance to the closest one of the three-dimensional positions of the pixels of the current depth map and the three-dimensional positions of the pixels of the previous depth map is minimized. "ICP" is an abbreviation of "Iterative Closest Point". Furthermore, the position/orientation obtaining unit 150 calculates local features of the previous frame and the current frame, and obtains the corresponding point that indicates the matching structure. Then, by solving a PnP problem so that the distance between the corresponding points when the local features of the previous frame are projected to the current frame using the depth value of the depth map is minimized, it is possible to calculate position and orientation. Note that the geometric information estimation unit may also be configured to indirectly use an output of a learning model. That is, the position and orientation may be calculated based on geometric information in which an output of a learning model is corrected through time-series filtering (described in K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017).

In Embodiment 1, geometric information estimated by a learning model is a depth map. However, a learning model that is applicable to the present embodiment may be of any type as long as it can calculate the position and orientation of the image capturing apparatus based on geometric information that is output. For example, a learning model may also be used that calculates, as geometric information, a remark point for use in obtaining position and orientation from an input image. Here, the geometric information estimation unit 140 estimates a remark point based on a previous frame and a current frame using a learning model, and the position/orientation obtaining unit calculates position and orientation using a five-point algorithm method based on the remark point indicating the matching structure between the previous frame and the current frame. Furthermore, a learning model may be used that is trained so as to estimate, upon input of two images of a previous frame and a current frame, six degrees of freedom in the position and orientation of the two images are estimated as geometric information (A. Kendall, M. Grimes and R. Cipolla, "PoseNet: A Convolutional Network for Real-Time 6-DOF Camera Relocalization", International Conference on Computer Vision (ICCV), 2015, pp. 2938-2946). At this time, instead of the position/orientation obtaining unit 150 calculating position and orientation, the geometric information estimation unit 140 may directly input the position and orientation estimated by using a learning model, as a position and orientation obtaining result, to the display information generation unit 12.

Embodiment 1 has described an example in which the present invention is applied to an application of aligning a virtual object with a real space in a mixed reality system. However, application of the information processing apparatus 1 as described in the present embodiment is not limited to this, and any application is possible as long as it uses geometric information output from a learning model, or a position and orientation obtaining result. For example, the information processing apparatus 1 may be mounted on a stand-alone moving robot or an automobile, and may be used as a stand-alone moving system that estimates the self-position of the robot or the automobile. The stand-alone moving system here may be provided with a moving mechanism such as an electric motor, and a control unit that decides an operation based on the position and orientation calculated by the position/orientation obtaining unit 150 and controls the moving mechanism. Furthermore, the information processing apparatus 1 may be mounted at a distal end of an industrial robot hand and may be used as a robot system that calculates the position and orientation of the robot hand. The robot system here may also be provided with a manipulator such as a robot arm, a grip device such as a suction hand, and a control unit that controls the manipulator and the grip device based on the position and orientation calculated by the position/orientation obtaining unit 150.

Furthermore, the usage of the information processing apparatus 1 is not limited to estimation of the position and orientation, and may include three-dimensional re-structuring. For example, the information processing apparatus 1 may be used as a measurement system for generating a CAD model such as an industrial component or a building. The measurement system here may also be provided with a three-dimensional model generation unit for generating a three-dimensional model based on the geometric information estimated by the geometric information estimation unit 140. Furthermore, the information processing apparatus 1 may be used as an apparatus for obtaining a depth map accurately from a camera that cannot obtain a depth map, such as an RGB camera or a camera for obtaining a grayscale image.

Embodiment 1 has described a configuration in which the mobile device includes the learning model selection unit 120 and the learning model group holding unit 130. However, a cloud server may have some of the functions of the information processing apparatus shown in Embodiment 1 and may execute the functions. For example, a configuration is also possible in which the cloud server includes the learning model selection unit 120 and the learning model group holding unit 130. In this configuration, the mobile terminal first transfers an input image to the cloud server using a not-shown communication unit. Then, the learning model selection unit 120 on the cloud server calculates evaluation values of the learning models held by the learning model group holding unit 130 on the cloud server, and selects a learning model based on the evaluation results. Then, the learning model selected by the cloud server is transferred to the mobile terminal using the communication unit. By employing such a configuration, the mobile device does not need to hold multiple groups of learning models, and does not need to execute calculation for selecting a learning model, and thus the present invention is applicable also to a mobile device provided only with a small calculating machine.

Furthermore, if the camera that has captured a training image is different from the image capturing apparatus 11, camera parameters of the camera that has captured the training image for each of the learning models held by the learning model group holding unit 130 may also be held. In this case, geometric information is corrected, based on the camera parameters of the image capturing apparatus 11 and the camera parameters of the camera that has captured the training image, so that the scale of the geometric information estimated by the geometric information estimation unit 140 using the learning model conforms to the image capturing apparatus 11, as described in K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017.

The present embodiment has described a configuration in which the image capturing apparatus for capturing an image is an RGB camera. Note however that the image capturing apparatus is not limited to the RGB camera, and may be any camera as long as it captures an image of a real space, that is, for example, a camera for capturing a grayscale image, or a camera that can capture depth information, a range image, or three-dimensional point group data. Alternatively, a monocular camera, or a composite camera with two or more cameras and sensors may also be used.

Embodiment 2

In Embodiment 1, the similarity between an input image and a training image used in training of a learning model is calculated as an evaluation value. In contrast, Embodiment 2 will describe an example in which the type of object detected from the input image is compared with the type of object that has been detected in advance from the training image, to calculate an evaluation value of the learning model.

Configuration of Information Processing Apparatus

The configuration of an information processing apparatus in Embodiment 2 is the same as in FIG. 1 showing the configuration of the information processing apparatus 1 described in Embodiment 1, and thus a description thereof is omitted. The learning model group holding unit 130 holds information different from that of Embodiment 1. In the present embodiment, the learning model group holding unit 130 holds at least two learning models. Furthermore, the learning model group holding unit 130 also holds object information lists that each include information on objects detected in advance from a training image used in training of a learning model. In the present embodiment, it is assumed that an object information list is associated with each learning model, and the object information list holds object information (type of object in the present embodiment) such as, for example, "desk", "table", "bed", and "chair".

Processing

The procedure of the entire processing of Embodiment 2 is the same as in FIG. 4 showing the processing procedure of the information processing apparatus 1 described in Embodiment 1, and thus a description thereof is omitted. Furthermore, details of learning model selection in step S140 shown in FIG. 4 are the same as those of FIG. 5, and thus descriptions thereof are omitted. Embodiment 2 differs from Embodiment 1 in the evaluation value calculation processing of step S1120 in FIG. 5 in which the learning model selection unit calculates evaluation values of the learning models. In the present embodiment, in place of the processing shown in FIG. 6, processing shown in FIG. 7 will be performed.

Figure 7:
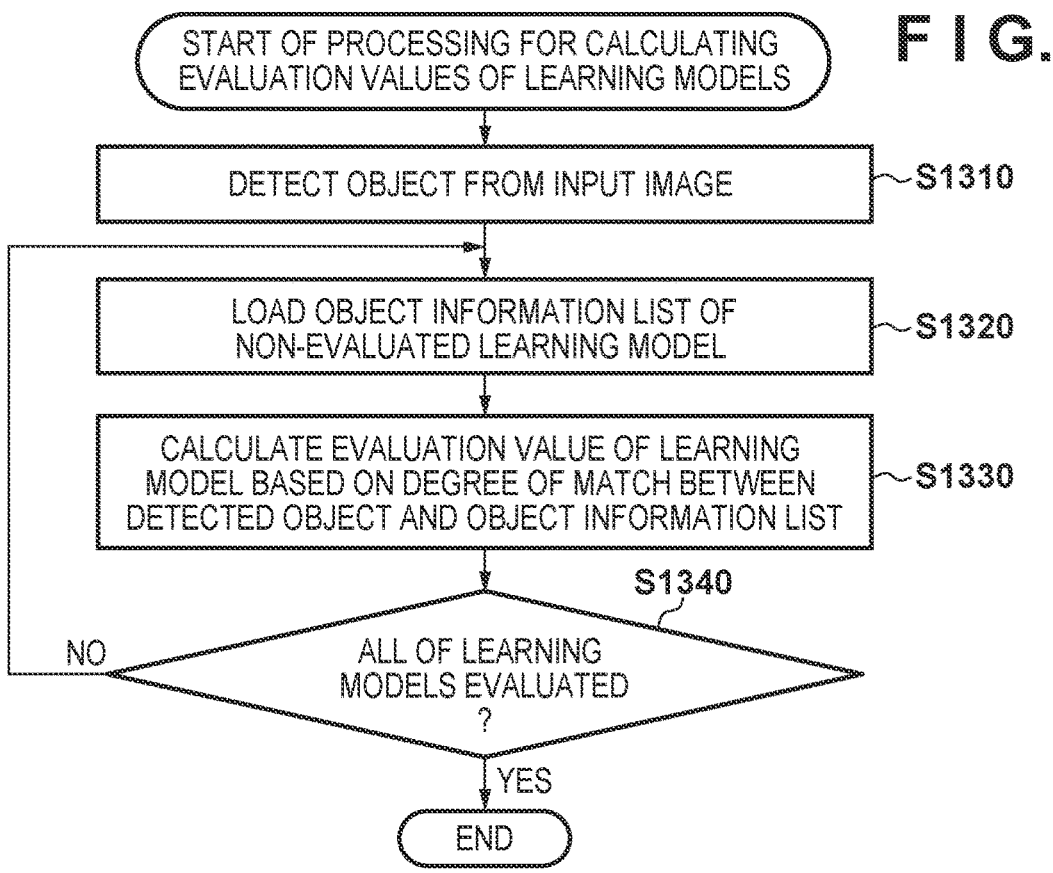
FIG. 7 is a flowchart illustrating a processing procedure of step S1120 in Embodiment 2.

The following will describe processing for calculating evaluation values of the learning models according to the present embodiment with reference to FIG. 7. Note that step S1340 in FIG. 7 is the same as step S1230 of FIG. 6 and thus a description thereof is omitted.

In step S1310, the learning model selection unit 120 detects objects from the input image, and stores information indicating the detected objects in a detected object type list. An object detection learning model for determining whether or not there is any object is used for the object detection. The object detection learning model is a neural network that is trained using Deep Learning so as to output 1 if a target object is included in an input image, and output 0 if it is not included. The object detection learning model is used to detect objects from the input image, and records, if the target object type is included, information indicating the object in the detected object type list.

In step S1320, the learning model selection unit 120 loads, from the learning model group holding unit 130, an object information list associated with a learning model for which an evaluation value has not yet been calculated onto the H13, which is a RAM.

In step S1330, the learning model selection unit 120 compares the detected object type list relating to the objects detected in step S1310 with the object information list loaded in step S1320, and searches for object information that include a matching object type. If a matching object type is found, a count is given to the learning model that includes the detected object. Specifically, a memory for holding an integer is assigned to each learning model, and the value of the memory is incremented by 1 if a matching object information is found. Note that this memory is assumed to have been initialized to 0 by initialization in step S110 in FIG. 4. Note that an evaluation value in the present embodiment refers to the number of counts.

Effects

As described above, in Embodiment 2, information on objects detected from an input image is compared with information on objects detected from training images used in training of learning models, and the larger the number of the same type of object that are included is, the higher the evaluation value that is given to a learning model is. Then, the learning model having the highest evaluation value is used to estimate geometric information, and based thereon, the position and orientation of the image capturing apparatus are calculated. Accordingly, it is possible to select the learning model whose training image includes the same type of objects as that in the input image, and allow the learning model to accurately estimate geometric information, making it possible to accurately obtain the position and orientation of the image capturing apparatus.

Modification

In Embodiment 2, the object detection learning model that is trained in advance through machine learning is used to detect objects from a training image and an input image. However, any type of object detection may be performed as long as it can determine whether or not a specific type of object is included. For example, a configuration is also possible in which local features are calculated in advance for each object type, and, if the number of local features that match with the local features detected from the input image is equal to or larger than a predetermined threshold, it can be determined that the object has been detected. Alternatively, object detection may also be performed such that a template image obtained by cutting out an object image in advance is held, and template matching is performed on the training image and the input image.

In the object detection processing of Embodiment 2, an evaluation value is given to a learning model based on a binary determination result as to whether or not an object type has been detected. However, it is sufficient that, if the same type of object is included in an input image and a training image, a higher evaluation value will be given. For example, it is also possible to use an object detection learning model trained so as to output continuous values from 0 to 1, which are the existence probability, and add an evaluation value to a learning model based on these values. Specifically, in step S1330, a memory for holding a real number may be assigned to each learning model, and a value obtained by adding, to the value of the memory, the product of the existence probability of the type of object detected from the training image and the existence probability of the type of object detected from the input image may be used as an evaluation value.

Embodiment 3

In Embodiment 1, the similarity between an input image and a training image used in training of a learning model is calculated as an evaluation value. In Embodiment 2, the type of object detected from the input image is compared with the type of object that has been detected in advance from the training image, to calculate an evaluation value of the learning model. In contrast, Embodiment 3 will describe an example in which information relating to positions at which the input image and the training image used in training of the learning model were shot is used, to calculate an evaluation value of the learning model.

Configuration of Information Processing Apparatus

Figure 10:
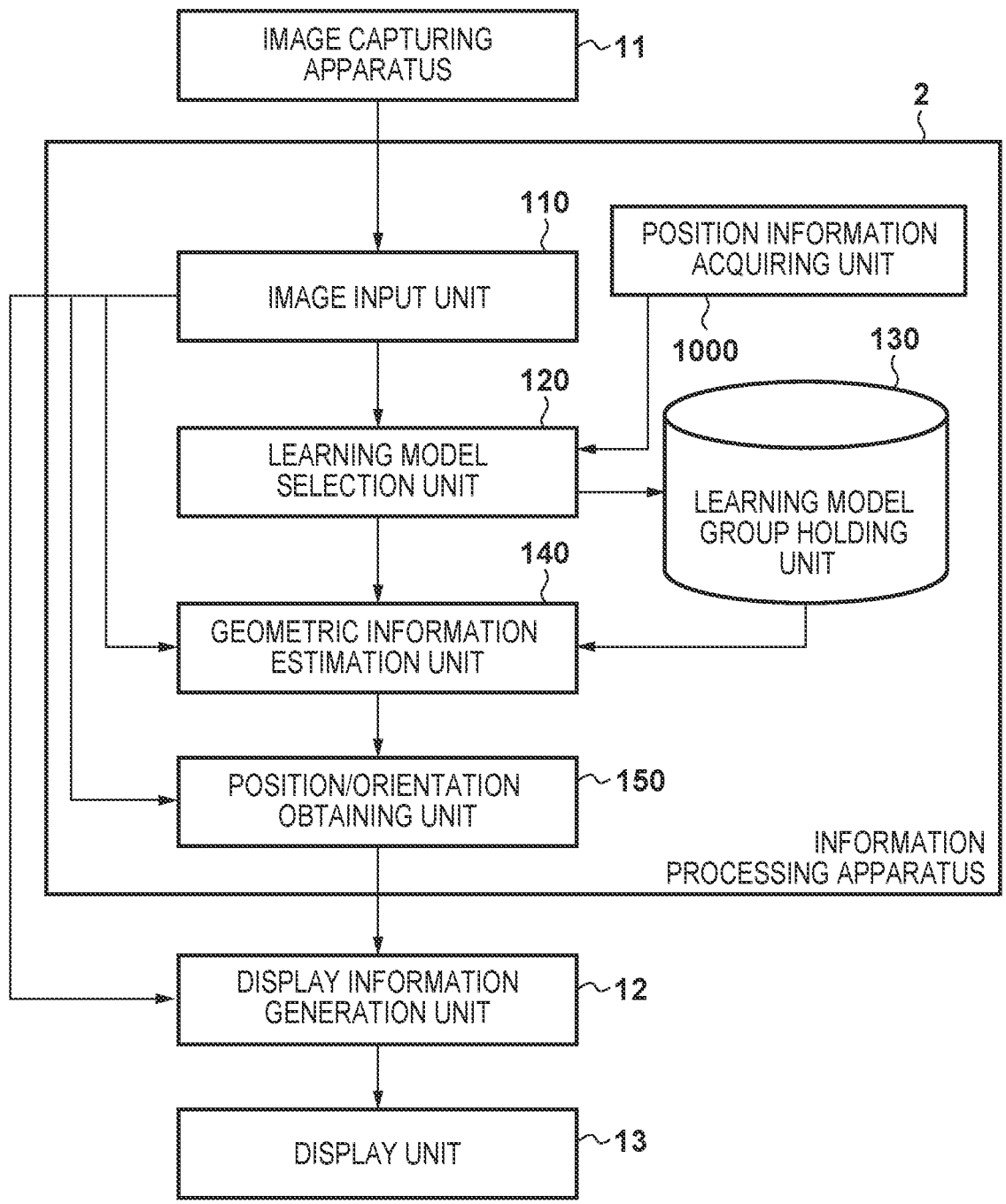
FIG. 10 is a diagram illustrating a functional configuration of an information processing apparatus 2 according to Embodiment 3.

As shown in FIG. 10, an information processing apparatus 2 according to Embodiment 3 is provided with, in addition to the configuration of the information processing apparatus 1 that is shown in FIG. 1 and is described in Embodiment 1, a position information acquiring unit 1000. The position information acquiring unit 1000 receives sensor information such as a GPS signal or a WiFi signal from a not-shown position information acquisition sensor, and calculates, as position information, coordinate values or the identification ID of an access point, for example. The position information acquiring unit 1000 outputs the acquired position information to the learning model selection unit 120. Furthermore, the learning model group holding unit 130 holds information different from that of Embodiment 1. In the present embodiment, it is assumed that the learning model group holding unit 130 holds at least two learning models and position information lists that each include information relating to the position at which a training image used in training of a learning model was shot.

Processing

The processing procedure of Embodiment 3 is the same as in FIG. 4 showing the processing procedure of the information processing apparatus 1 described in Embodiment 1, and thus a description thereof is omitted. Furthermore, details of step S140 in FIG. 4 are the same as those of FIG. 5, and thus descriptions thereof are omitted. Embodiment 3 differs from Embodiment 1 in the evaluation value calculation processing of step S1120 in FIG. 5 in which the learning model selection unit calculates evaluation values of the learning models. In the present embodiment, in place of the processing shown in FIG. 6, processing shown in FIG. 8 will be performed.

Figure 8:
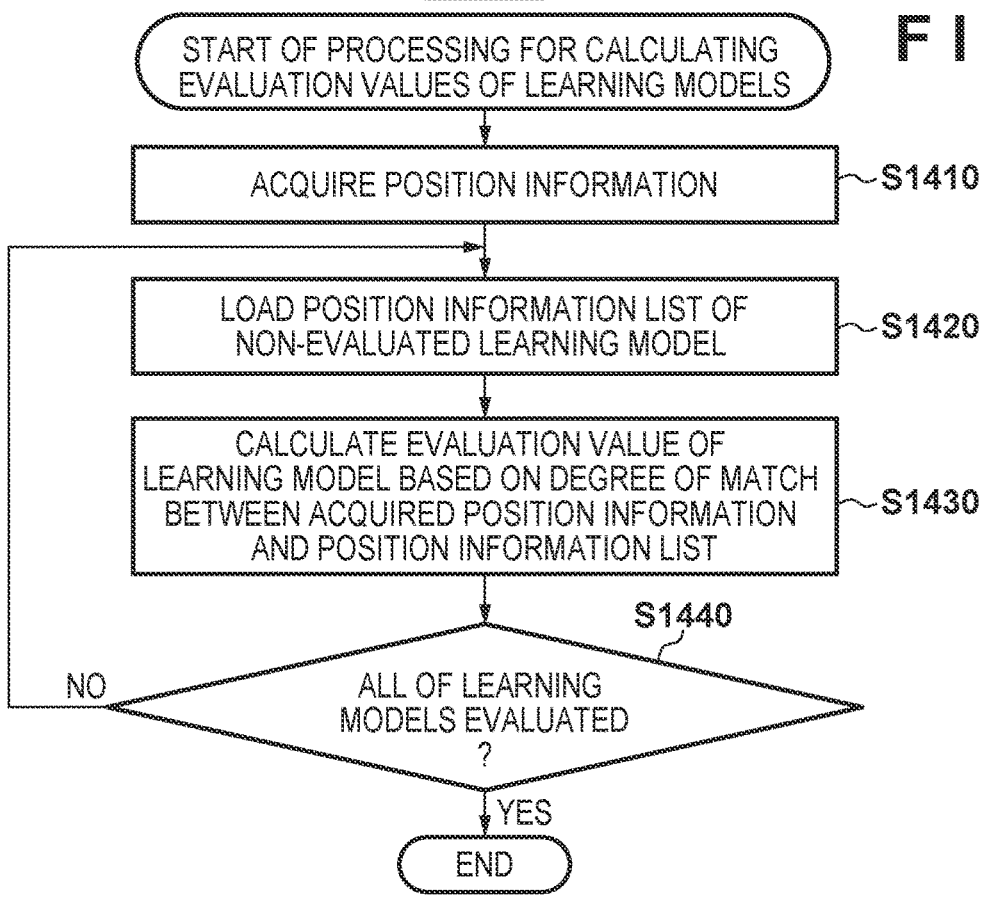
FIG. 8 is a flowchart illustrating a processing procedure of step S1120 in Embodiment 3.

The following will describe processing for calculating evaluation values of the learning models according to the present embodiment with reference to FIG. 8. Note that step S1440 in FIG. 8 is the same as step S1230 of FIG. 6 and thus a description thereof is omitted.

In step S1410, the position information acquiring unit 1000 acquires position information such as latitude and longitude or the identification ID of an access point, from the sensor information such as a GPS signal or a Wi-Fi signal that was acquired from the position information acquisition sensor when the training images held by the learning model group holding unit 130 were captured.

In step S1420, the learning model selection unit 120 loads, from the learning model group holding unit 130, a position information list associated with a learning model for which an evaluation value has not yet been calculated onto the H13, which is a RAM.

In step S1430, the learning model selection unit 120 compares the position information acquired in step S1410 with the position information list loaded in step S1420, and searches for matching position information. Specifically, if the identification ID of a WiFi access point is used as position information, and the matching identification ID of the access point is found, a count is given to the learning model for which this position information was found.

Furthermore, if latitude and longitude obtained from the GPS are used as position information, it is determined whether or not the distance between the position information included in the position information list acquired in step S1410 and the position information held by the learning model group holding unit is within a predetermined threshold. If the countries or regions of the coordinates obtained based on the position information are the same, it is determined that position information match each other, and a count is given to this learning model. A memory for holding an integer is assigned to each learning model, and the value of the memory is incremented by 1 if matching position information is found. This memory is assumed to have been initialized to 0 by initialization in step S110 in FIG. 4. Note that an evaluation value in the present embodiment refers to the number of counts.

Effects

As described above, in Embodiment 3, the higher the degree of match between information on the position at which an input image was shot and information on the position at which a training image used in training of a learning model was shot is, the higher the evaluation value that is given to the learning model is. Accordingly, it is possible to select a learning model whose information relating to the position at which a training image was shot matches that of the input image, and thus allow the learning model to accurately estimate geometric information, making it possible to calculate the position and orientation of the image capturing apparatus accurately.

Modification

In Embodiment 3, latitude and longitude acquired as position information from the GPS, or the identification ID of a WiFi access point are exemplified. However, any position information may be used as long as the positions at which an input image and a training image were shot can be identified. For example, the position information may be a country name obtained from latitude and longitude, a region name, an address, an identification ID of an entity other than a later-described WiFi access point.

As the position information measurement method, an example is exemplified in which latitude and longitude are obtained from a GPS signal, and the identification ID of an access point is obtained from a WiFi signal. However, any method may be used as long as it can measure position information. For example, if a region name is in the input image, position information may be calculated from this region name. A configuration is also possible in which the identification ID of an infrared beacon is detected using an optical sensor and the detected identification ID is used as position information, or the identification ID of an ultrasound beacon is detected using a microphone and the detected identification ID is used as position information. A configuration is also possible in which the identification ID of a wireless beacon is detected using BLE (Bluetooth (Registered Trademark) Low Energy) and the detected identification ID is used as position information. Furthermore, the base station ID of a 3G or 4G mobile network may be measured and used as the position information. Furthermore, only one or a plurality of the exemplified types of position information may be used.

Embodiment 4

In Embodiment 1, the similarity between an input image and a training image used in training of a learning model is calculated as an evaluation value. In Embodiment 2, the type of object detected from the input image is compared with the type of object that has been detected in advance from the training image, to calculate an evaluation value of the learning model. In Embodiment 3, information relating to positions at which the input image and the training image used in training of the learning model were shot is used, to calculate an evaluation value of the learning model. However, in the aforementioned methods, a case may occur in which a learning model is selected that is trained with a training image shot at the same position but having a different view status, such as a learning model trained with a training image shot at night although the scene of an input image indicates daytime, a learning model trained with a training image of a scene of winter with snow although the scene of an input image indicates spring, or a learning model trained with a training image of a fine day although the scene of an input image indicates a rainy day. However, if a learning model is used that is trained with a training image having a different view status, the accuracy in geometric information estimated by the learning model is reduced, and thus it is difficult to accurately obtain position and orientation. Accordingly, in Embodiment 4, the higher the degree of match between information on statuses that may change the view of an input image and a training image used in training of a learning model, such as date, season, or weather at which the images were shot, is, the higher the evaluation value that is calculated for a learning model is.

Configuration of Information Processing Apparatus

The configuration of an information processing apparatus according to Embodiment 4 is the same as in FIG. 1 showing the configuration of the information processing apparatus 1 described in Embodiment 1, and thus a description thereof is omitted. The learning model group holding unit 130 holds information different from that of Embodiment 1. In the present embodiment, the learning model group holding unit 130 holds at least two learning models. Furthermore, the learning model group holding unit 130 also holds, for each learning model, status information indicating a status that may change the view of a training image used in training of this learning model when the image was shot. Note that the present embodiment will describe a case where date information is used as a specific example of status information. A status information list is associated with each learning model, and includes, as status information, information relating to a status in which a training image was shot. Furthermore, it is assumed that the information processing apparatus includes an internal clock that can obtain a shooting time.

Processing

The procedure of the entire processing of Embodiment 4 is the same as in FIG. 4 showing the processing procedure of the information processing apparatus 1 described in Embodiment 1, and thus a description thereof is omitted. Furthermore, details of learning model selection in step S140 shown in FIG. 4 are the same as those of FIG. 5, and thus descriptions thereof are omitted. Embodiment 4 differs from Embodiment 1 in the evaluation value calculation processing of step S1120 in FIG. 5 in which the learning model selection unit calculates evaluation values of the learning models.

In the evaluation value calculation processing, the higher the degree of match between date information obtained from the internal clock and date information, namely, status information held by the learning model group holding unit is, the higher the evaluation value that is given to the learning model is. Specifically, if a difference in time between a shooting time held in the status information list and the shooting time of an input image is within a predetermined time, and the shooting date is within a predetermined number of days, it is determined that this is a learning model that has a training image shot at the same time and season. A memory that can hold binary values (1: True/0: False), which represents match/unmatch of status information, is assigned to each learning model, and the memory is set to 1 (True) if it is determined that this is a learning model that has a training image shot at the same time and season. Note that this memory is assumed to have been initialized to 0 (False) by initialization in step S110 in FIG. 4.

Effects

As described above, in Embodiment 4, the higher the degree of match between status information on the statuses that can change the view of an input image and a training image used in training of a learning model is, the higher the evaluation value that is given to the learning model is. Accordingly, it is possible to select the learning model whose training image shooting status matches that of the input image, and allow the learning model to accurately estimate geometric information, making it possible to calculate the position and orientation of the image capturing apparatus accurately.

Modification

In Embodiment 4, date information obtained from an electronic clock included in the information processing apparatus is used as the status information. However, any date information obtaining method may be used as long as it can obtain the current time, and date information may also be obtained from an external server through a network via an I/F (H17) or may be input by a user using an input means such as a keyboard.

In Embodiment 4, date information is used as status information. However, the status information is not limited to date information, and any information may be used as long as it indicates the status that changes the view of a captured image. For example, instead of directly using date information, time categories, such as morning, daytime, evening, night, and dawn, classified based on the date information may be used as the status information. Here, a configuration is also possible in which the status information list includes information relating to a time category at which a training image was shot, and the higher the degree of match between them is, the higher the evaluation value that is calculated for a learning model is. Alternatively, season information such as spring, summer, autumn, and winter may be used as the status information, and at this time, a configuration is also possible in which the status information list includes information relating to the season in which a training image was shot, and the higher the degree of match between them is, the higher the evaluation value that is calculated for a learning model is. Also, weather information such as clear weather, cloudiness, rainy weather, and snowy weather obtained from a Web site that distributes weather reports through a network via the I/F (H17) may be used as the status information. At this time, a configuration is also possible in which the status information list includes information relating to the weather in which a training image was shot, and the higher the degree of match between them is, the higher the evaluation value that is calculated for a learning model is.

Embodiment 5

In Embodiment 1, the similarity between an input image and a training image used in training of a learning model is calculated as an evaluation value. In Embodiment 2, the type of object detected from the input image is compared with the type of object that has been detected in advance from the training image, to calculate an evaluation value of the learning model. In Embodiment 3, information relating to positions at which the input image and the training image used in training of the learning model were shot is used, to calculate an evaluation value of the learning model. In Embodiment 4, an evaluation value of the learning model is calculated based on the degree of match between status information that may change the view of a captured image. In contrast, Embodiment 5 will describe an example in which an evaluation value of the learning model is calculated in a manner in which Embodiments 1 to 4 are combined with each other.

Configuration of Information Processing Apparatus

The configuration of the information processing apparatus in Embodiment 5 is the same as in FIG. 1 showing the configuration of the information processing apparatus 1 described in Embodiment 1, and thus a description thereof is omitted. The learning model group holding unit 130 holds information different from that of Embodiment 1. In the present embodiment, the learning model group holding unit 130 holds at least two learning models, and, for each model, at least one training image used in training of this model, as described in Embodiment 1. Furthermore, as described in Embodiment 2, object information lists are provided that include information relating to objects detected in advance from the training images of the models. As described in Embodiment 3, position information lists are provided that include information relating to the positions at which the training images of the models were shot. Furthermore, as described in Embodiment 4, status information lists are provided that include information relating to statuses when the training images of the models were shot.

Processing

The processing procedure of Embodiment 5 is the same as in FIG. 4 showing the processing procedure of the information processing apparatus 1 described in Embodiment 1, and thus a description thereof is omitted. Embodiment 5 differs from Embodiment 1 in the procedure in step S140 in which the learning model selection unit 120 selects a learning model.

In step S140, the learning model selection unit 120 calculates evaluation values of the learning models using the object information lists held by the learning model group holding unit 130. At this time, the evaluation values described in step S1220 of Embodiment 1 are calculated as evaluation values 1. Then, as evaluation values 2 and evaluation values 3, continuous values 0 to 1 are calculated by normalizing the numbers of counts of the learning models described in Embodiment 2, Embodiment 3, and Embodiment 4 by dividing the numbers of counts by the maximum number of counts thereof.

In step S1130 in FIG. 5, the learning model selection unit 120 selects a learning model to be used, based on the evaluation values 1 to 4 calculated in steps S1220, S1330, and S140. In the present embodiment, it is assumed that the learning model in which the sum of the evaluation values 1 to 4 is maximum is selected, and the learning model selection unit 120 writes this learning model into a storage unit (for example, RAM: H13), and a state is realized in which the geometric information estimation unit 140 can estimate geometric information.

Effects

As described above, in Embodiment 5, evaluation values of learning models are calculated such that the higher the similarity between an input image and a training image, the degree of match between the types of object detected from the input image and the training image, and the degree of match between information on the positions at which the input image and the training image were shot are, the higher the evaluation value is. By selecting the learning model whose training image is similar to the input image, whose training image has the same type of captured object as in the input image, and whose training image was shot at the same position, time, season, or weather as that of the input image, it is possible to accurately estimate geometric information. Accordingly, it is possible to calculate the position and orientation of the image capturing apparatus accurately.

Modification

In Embodiment 5, evaluation values of the learning models are calculated based on the similarities between the input image and training images, degree of match between the types of objects detected from the input image and the training images, the degree of match between information on positions at which the input image and the training images were shot, and the degree of match between information on statuses that may change the view of a captured image. However, a configuration is also possible in which two of the above-described four bases are used. Furthermore, in the learning model determination in step S1130, for example, a learning model may be selected for which a weighted average of the evaluation values 1 to 3 is maximum. Alternatively, the learning model may be selected that has the largest one of evaluation values that are equal to or greater than a predetermined threshold, or the learning model may be selected that has the largest value of all of the evaluation values.

Furthermore, based on the evaluation values, a learning model may be selected gradually. For example, first, learning models are broadly selected based on position information and status information, and then a learning model is selected that is trained with a similar image or a training image on which the type of object appears. Specifically, learning models are broadly selected in which the evaluation values 3 and 4 are equal to or greater than a predetermined threshold, and then, from among them, the learning model that has the largest sum of the evaluation values 1 and 2 is selected. Accordingly, it is possible to mitigate the similar image search or object detection processing that has a large amount of calculation.

Furthermore, the information processing apparatus according to the present invention, if installed in an automobile, may be used to control a moving mechanism such as an electric motor in case of automated driving, or to assist in acceleration and deceleration or steering operation when a person drives the automobile, or may be used as a navigation system. Furthermore, the information processing apparatus is not limited to being installed in an automobile, and may be implemented in a cloud, and a result processed via a network may be used in control of the automobile, assisting in driving, navigation, or the like.

If the information processing apparatus according to the present invention is used in automobile, the learning model selection unit 120 may also select a learning model, based on driving information acquired from a car-navigation system or various sensors installed in the automobile, or various control devices via the communication I/F (H17). Note that, if such a configuration is applied, any method may be used as long as a learning model can be selected based on driving information acquired from the automobile. Specifically, as the driving information, the category of a scene (such as an urban area, a mountain area, a seaside area, inside of a tunnel, or a highway) that is attached to map information of the car-navigation system, and a learning model may be selected based on the category information of the scene as described in Embodiment 1. As another selection method, a learning model may be selected as described in Embodiment 2, in which, as driving information, persons or automobiles on a road, traffic lights, signs and the number or frequency thereof, road statuses (the number of cars, the road surface: asphalt or earth) are acquired from a camera installed in the automobile, and are used as object information. Alternatively, as driving information, information on the address at which automobiles are driving and that are calculated by the car-navigation system, information on the region name recognized based on a traffic sign captured by the camera installed in the automobile, and sensor information acquired from GPS, WiFi, or various types of beacon are obtained, and a learning model may be selected based on the position information obtained from them as described in Embodiment 3. Furthermore, a learning model may be selected, using time information obtained from the car-navigation system, information as to whether or not a light is turned on (that can be used to determine it is daytime/night) or whether or not a windshield wiper is operated (that can be used to determine weather is fine/rainy) as status information as described in Embodiment 4. Furthermore, evaluation values may be calculated using the automobile type, and the installation position and the installation orientation of the camera in the automobile as status information, and a higher evaluation value may be calculated for a learning model whose training image was shot by the camera installed in the same type of automobile or at the same shooting position and same orientation as those of an input image. Note here that a plurality of examples have been described in which the methods described in Embodiments 1 to 4 are applied to an automobile, but any one of the Embodiments 1 to 4 may be used or a combination of a plurality thereof may be used. Furthermore, a method in which a learning model is selected based on driving information of the user's own automobile, but any driving information may be used as long as it can be used to select a learning model, and a learning model may be selected based on driving information acquired by a neighboring automobile, or driving information acquired from a traffic light, a road sign, a stand-alone type camera, or various sensors placed on a side of the road.

Embodiment 6

In Embodiments 1 to 5, a learning model is selected based on the similarity between an input image and training images, information on objects detected from the images, information on the positions at which the images were shot, or information on the status that may change the view of the captured images. In contrast, in Embodiment 6, evaluation values of learning models held by the learning model group holding unit are calculated by comparing geometric information (second geometric information) estimated based on input images through motion stereo with geometric information (third geometric information) estimated based on the learning models. Note that geometric information output by the learning model selected by the learning model selection unit is referred to as first geometric information.

In other words, "first geometric information" refers to geometric information that is output by a selected learning model, and is used to obtain position and orientation. "Second geometric information" refers to geometric information obtained through motion stereo or the like, and is used to select a learning model. "Third geometric information" refers to geometric information output by a group of learning models, and is used to select a learning model.

Configuration of Information Processing Apparatus

The configuration of an information processing apparatus according to Embodiment 6 is the same as in FIG. 1 showing the configuration of the information processing apparatus 1 described in Embodiment 1, and thus a description thereof is omitted. Embodiment 6 differs from Embodiment 1 in the functions of constituent elements and the relationship between input and output of data thereof.

The geometric information estimation unit 140 inputs, to the learning model selected by the learning model selection unit 120, an input image input through the image input unit 110, and estimates first geometric information. Also, the geometric information estimation unit 140 calculates second geometric information based on a plurality of images input through the image input unit 110. The method for calculating the second geometric information will be described later. Furthermore, the geometric information estimation unit 140 inputs the input images to the learning models held by the learning model group holding unit 130, and estimates third geometric information. Then, the second geometric information and the third geometric information are output to the learning model selection unit 120. Also, the first geometric information is output to the position/orientation obtaining unit 150.

Based on the input images input through the image input unit 110 and the second geometric information and the third geometric information estimated by the geometric information estimation unit 140, the learning model selection unit 120 calculates evaluation values of the learning models held by the learning model group holding unit 130. The learning model selection unit 120 selects a learning model based on the evaluation values, and outputs the selected learning model to the geometric information estimation unit 140. The learning model group holding unit 130 holds at least two learning models.

Processing

The processing procedure of the information processing apparatus of Embodiment 6 is the same as in FIG. 4 illustrating the processing procedure of the information processing apparatus 1 described in Embodiment 1, and FIG. 5 illustrating details of the learning model selection processing in step S140, and thus a description thereof is omitted. Embodiment 6 differs from Embodiment 1 in that the geometric information estimation unit 140 further calculates the second geometric information and the third geometric information, and how evaluation of the learning models proceeds.

In step S150, the geometric information estimation unit 140 estimates third depth maps, which serve as the third geometric information, using the learning models. Furthermore, the geometric information estimation unit 140 calculates the second geometric information based on the input images. "Second geometric information" of the present embodiment refers to a second depth map calculated using a motion stereo method based on a first input image, which is captured by the image capturing apparatus 11 at a first time t, and a second input image, which is captured by the image capturing apparatus 11 at a second time t+1 after the image capturing apparatus 11 has been moved by a given movement amount (for example, 10 cm in the X axis direction in the camera coordinate system). Note that scale of depth is defined using the above-described given movement amount as a base line length.

Also, the learning model selection unit 120 calculates evaluation values of the learning models held by the learning model group holding unit 130. The learning model selection unit 120 calculates, as an evaluation value, an inverse number of the value obtained by adding differences in depth of the pixels between the third depth map and the second depth map to all of the pixels of the image. Also, the learning model selection unit 120 selects the learning model that has the largest evaluation value.

Effects

In Embodiment 6, evaluation values of learning models are calculated, by comparing the third geometric information estimated by the geometric information estimation unit 140 using the learning models with the second geometric information estimated from input images through motion stereo. Accordingly, it is possible to select a learning model that can output geometric information similar to the second geometric information estimated through motion stereo, and obtain the position and orientation of the image capturing apparatus accurately.

Furthermore, even if learning models are trained with training images of a plurality of scenes, or no information characterizing learning models is held, it is possible to accurately select a learning model that can output geometric information. Accordingly, it is possible to obtain the position and orientation of the image capturing apparatus accurately.

Modification

In Embodiment 6, the image capturing apparatus 11 for capturing an image employs an RGB camera to calculate the second geometric information by the motion stereo method. However, if the image capturing apparatus 11 is a camera that can capture depth information, a range image, or three-dimensional point group data, depth information that can be obtained from them may also be used as the second geometric information. Furthermore, if a camera provided with multiple, namely, two or more camera and sensors is used, the depth calculated by performing stereo matching on images captured by the composite camera may also be used as the second geometric information. Furthermore, if the information processing apparatus is further provided with a sensor such as a LiDAR or a millimeter-wave radar that can obtain depth information, the depth information obtained therefrom may be used as the second geometric information.

In Embodiment 6, the base line length is determined by moving the camera by a predetermined amount. However, if the information processing apparatus 1 is provided with a movement amount measurement sensor that can estimate the movement amount of the camera, such as an inertial measurement unit e.g., IMU, the scale may be defined by using the sensor information (movement amount) obtained by the sensor as a base line length. IMU is an abbreviation of inertial measurement unit.

Furthermore, even if the base line length of two images used in the motion stereo is unknown, the learning model selection unit 120 may add evaluation values to the respective learning models held by the learning model group holding unit 130.

Specifically, first, the learning model selection unit 120 calculates a second depth map by normalizing a depth map that was obtained through motion stereo when the base line length was unknown, with an average value, a median value, a maximum value, or a minimum value, for example. Then, the learning model selection unit 120 inputs the input images to the learning models held by the learning model group holding unit 130, and calculates third depth maps by normalizing the obtained depth map with an average value, a median value, a maximum value, or a minimum value. Then, an inverse number of the sum of differences in depth between the third depth map and the second depth map over the entire image is used as an evaluation value, and the learning model that has the largest evaluation value is selected.

Accordingly, even if the base line of motion stereo is unknown, it is possible to select a learning model in which schematic structures of the third depth map and the second depth map match each other, and accurately obtain position and orientation.

In Embodiment 6, a learning model is selected in which the third geometric information and the second geometric information match each other. However, it is also possible to determine a learning model by only using at least third geometric information, without calculating the second geometric information. For example, the learning model selection unit 120 may add evaluation values to the learning models, based on a residual when the position/orientation obtaining unit 150 calculates position and orientation based on the third geometric information output by the learning models. Specifically, the position/orientation obtaining unit 150 calculates position and orientation so that, when the pixels of a previous frame are projected onto a current frame based on the depth values of the pixels of the previous depth map estimated by each learning model, errors in brightness between the pixels of the previous frame prior to projection and the pixels of the current frame after the projection are minimized. Furthermore, the residual of the errors in brightness at this time is input to the learning model selection unit 120. Then, the learning model selection unit 120 sets an inverse number of each residual input by the position/orientation obtaining unit 150 as an evaluation value, and selects the learning model that has the largest evaluation value. Furthermore, when calculating position and orientation through repeated calculation so that errors are gradually reduced, the position/orientation obtaining unit 150 measures the number of times and time period taken up until the errors converge, and may input them to the learning model selection unit 120. At this time, the learning model selection unit 120 may use an inverse number of the number of times or the time period as an evaluation value, and may select the learning model that has the largest evaluation value.

Also, a configuration is also possible in which third depth maps output by the learning models held by the learning model group holding unit 130 are used as initial values, and second depth maps are calculated through time-series filtering. At this time, the learning model selection unit 120 adds evaluation values to the learning models based on the amounts of change in the depth values of the respective second depth maps in the time-series filtering. Specifically, an inverse number of an average value, a median value, a maximum value, a minimum value, or a sum of the amounts of change in the depth values of the pixels through time-series filtering, may be calculated as the evaluation value of each learning model, and a learning model that has the highest evaluation value may be selected. Furthermore, dispersion values and reliabilities in depth of the pixels in the time-series filtering (uncertainty map in K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017) are obtained, and the learning model that has the largest inverse number of the dispersion value, or the largest average value, median value, maximum value, minimum value, or sum of the reliabilities may be selected.

Embodiment 6 has described a case in which geometric information output by each learning model is a depth map. However, learning modes may be used that each output, as a result of two input images shot at different points in time being input, geometric information of six parameters of relative position/orientation between the two images. Note that the relative position/orientation output by the learning models is referred to as "first relative position/orientation". When such learning models are used, the learning model selection unit 120 detects feature points of the two images to perform matching therebetween, and calculates second relative position/orientation using a five-point algorithm based on the correspondence relationship of the feature points at which the feature amounts match each other between the two images. At this time, inverse numbers of squire distances of the six parameters of the first relative position/orientation and the second relative position/orientation are set as evaluation values, and the learning model selection unit 120 selects the learning model that has the largest evaluation value.

In Embodiment 6, the learning model selection unit 120 compares the second depth map calculated through motion stereo with the third depth map output by a learning model, and adds an evaluation value to the learning model. However, if an object having a known size is detected from an input image, a higher evaluation value may be given to a learning model in which the object size matches that of the third depth map.

Figure 11:
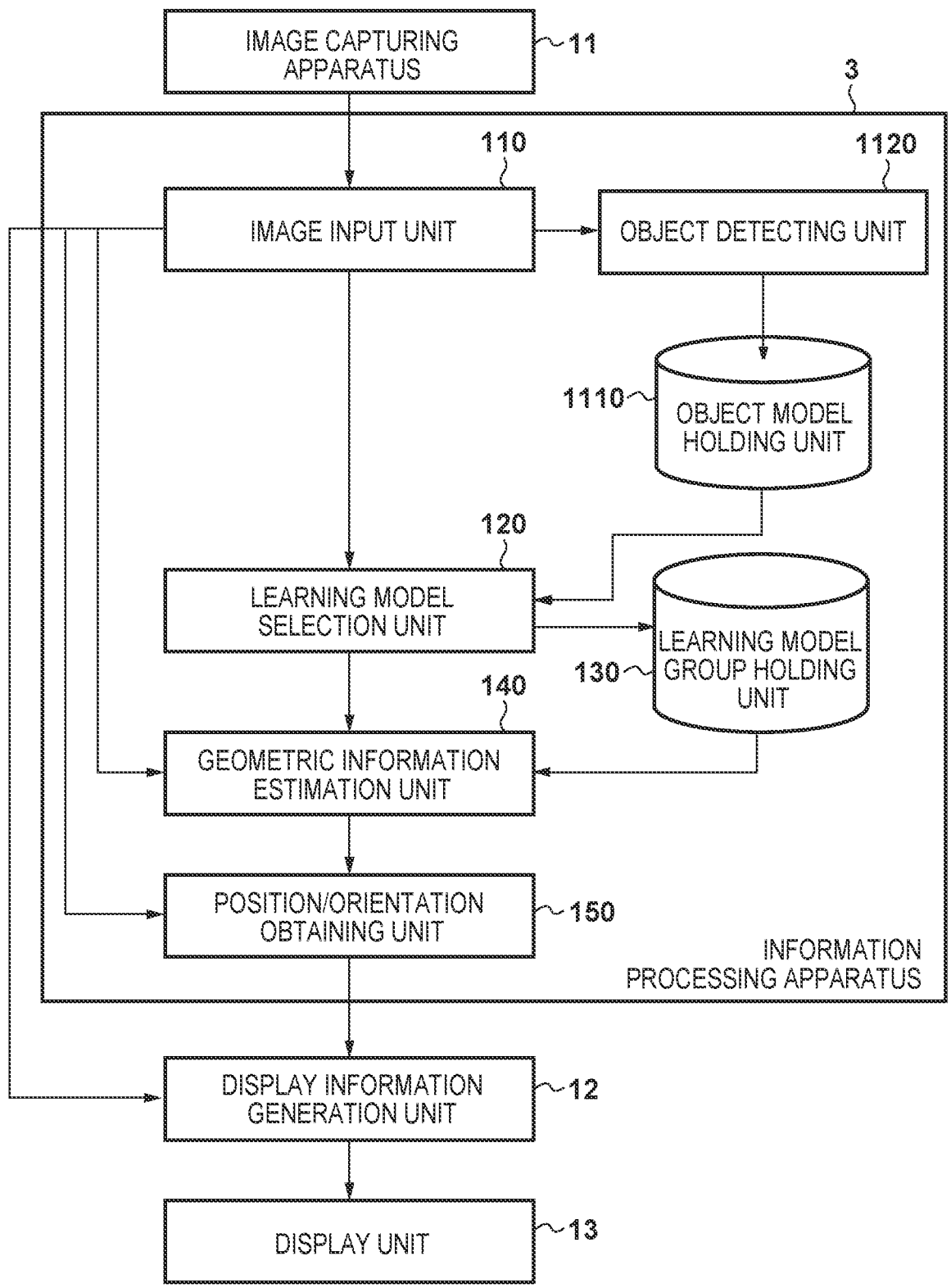
FIG. 11 is a diagram illustrating a functional configuration of an information processing apparatus 3 according to one of modifications of Embodiment 6.

As shown in FIG. 11, an information processing apparatus 3 according to the present modification is provided with, in addition to the configuration of the information processing apparatus 1 described in Embodiment 1, an object model holding unit 1110 and an object detecting unit 1120. The object model holding unit 1110 holds object models whose shape is known. The object detecting unit 1120 performs object detection from an input image and performs alignment of object models. Also, the learning model selection unit 120 compares information on a distance to an object surface that could be calculated when the object detecting unit 1120 detected the object and aligned the object model with the input image, with a depth value of an object region in the depth map of the region output by a learning model. Then, based on the comparison result, an evaluation value is given to the learning model. Note that the object model holding unit 1110 and the learning model group holding unit 130 may also be configured as an integral.

"Object models" in the present modification refers to three-dimensional CAD data of objects, such as cans, plastic bottles, human hands, which are general objects that have substantially the same size and shape for example. Specifically, first, the object detecting unit 1120 detects an object from an input image. In the object detection, for example, the Line2D method (S. Hinterstoisser, S. Holzer, C. Cagniart, S. Ilic, K. Konolige, N. Navab and V. Lepetit, "Multimodal Templates for Real-Time Detection of Textureless Objects in Heavily Cluttered Scenes" In European Conference on Computer Vision (ECCV), 2011) is performed, in which a gradient image, which is derivation of an input image, is aligned with silhouettes obtained when CAD data is observed from various directions, to align a CAD model to the object included in the input image. Note that the object alignment method is not limited to the above-described method. Then, based on the internal parameters of the camera, the distance from the camera to the CAD model surface is calculated. Lastly, the learning model selection unit 120 inputs the input image to the learning models, and calculates differences between the depth values of the object region of the depth maps, which are obtained geometric information, and the distance of the region calculated from the CAD model, and calculates an inverse number of the value obtained by adding the differences over the entire object region as an evaluation value. The learning model selection unit 120 selects the learning model that has the largest evaluation value. Note that the present modification has described a case where a general object with a known shape is used, but, instead of the general object, an artificial marker on which a specific pattern with a known size is printed, or a three-dimensional object of a unique size and shape may be used.

With this, it is possible to select a learning model that can accurately estimate the size of an object whose size is known and that appears in an input image, and improve the accuracy in the depth map to be output by the learning model, making it possible to improve the accuracy in obtaining position and orientation.

Embodiment 7

In Embodiments 1 to 6, a user cannot check whether or not a selected learning model is appropriate for the scene of an input image. In contrast, Embodiment 7 will describe an example in which, in order to enable the user to perform the checking, a display unit displays information that characterizes learning models, combined images in each of which a CG image of a virtual object is combined based on an output of a learning model, the three-dimensional shapes of scenes generated based on the output of the learning models, and the like.

Configuration of Information Processing Apparatus

Part of the configuration of an information processing apparatus in Embodiment 7 is the same as in FIG. 1 showing the configuration of the information processing apparatus 1 described in Embodiment 1, and thus a description thereof is omitted. Embodiment 7 differs from Embodiment 1 in that the display information generation unit 12 and the display unit 13 are incorporated into the information processing apparatus 1.

The learning model group holding unit 130 holds at least two learning models, and information lists that characterize the learning models. The "information lists that characterize the learning models" may be a training image described in Embodiment 1, an object information list described in Embodiment 2, or a position information list described in Embodiment 3. All or only some of these lists may be held. In the present embodiment, it is assumed that the learning model group holding unit 130 holds all of the three types of lists as information lists that characterize the learning models.

The learning model selection unit 120 outputs, to the display information generation unit 12, the information lists characterizing the learning models held by the learning model group holding unit 130 and the geometric information obtained by inputting an input image to the learning models held by the learning model group holding unit 130.

The display information generation unit 12 generates a first combined image obtained by rendering, as character information, the information list that characterizes each learning model. Furthermore, the display information generation unit 12 generates a second combined image obtained by combining a virtual object based on geometric information (first geometric information or third geometric information) estimated by the geometric information estimation unit 140. Furthermore, the display information generation unit 12 generates a third combined image obtained by rendering the three-dimensional shape of a scene of the input image generated based on the geometric information (the first geometric information or the third geometric information) estimated by the geometric information estimation unit 140. These combined images are output to the display unit 13 as display information. Note that it is also possible to generate at least one of the combined images as display information.

The display unit 13 is a display window of the mobile terminal, for example, and shows display information input by the display information generation unit 12.

Figure 9:
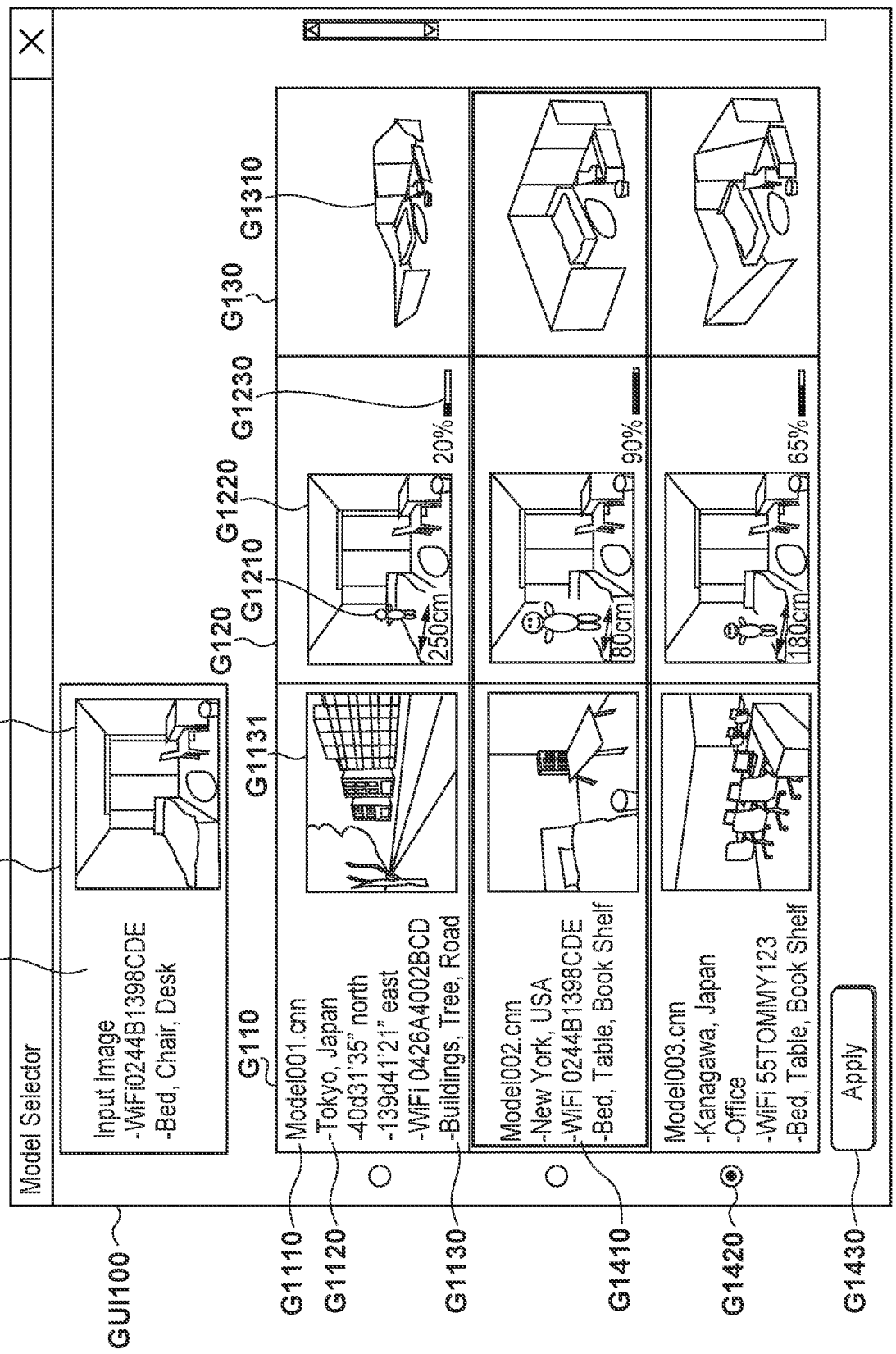
FIG. 9 is a diagram illustrating an example of a GUI showing information that characterizes learning models according to Embodiment 6.

FIG. 9 is a diagram of a GUI 100, which is an example of the display information shown by the display unit 13 according to the present embodiment.

G110 denotes windows for showing lists of information that characterizes the learning models, G120 denotes windows for showing combined images in each of which a CG image of a virtual object is combined, and G130 denotes windows for showing geometric information and three-dimensional shapes. Furthermore, G140 denotes a window for showing an input image and information detected from the input image. Furthermore, G1410 denotes a frame indicating the learning model selected by the learning model selection unit 120.

G1110 in the window G110 denotes an example of the model name of a learning model held by the learning model group holding unit 130. Furthermore, G1120 denotes an example of the position information list held by the learning model group holding unit 130. G1130 denotes an example of the object information list held by the learning model group holding unit 130. G1131 denotes an example of the training image used in training of a learning model held by the learning model group holding unit 130. Furthermore, G1140 in the window G140 denotes examples of the types of objects appearing in the input image and information relating to the position at which the input image was captured. G1150 in the window G140 denotes an example of the input image. The user can compare the contents shown in the windows G110 and G140 with each other, to check whether or not the learning model selected by the learning model selection unit 120 is appropriate.

G1210 in the window G120 denotes a CG image of a virtual object that was combined with the input image based on the geometric information estimated by the geometric information estimation unit 140. G1220 denotes an example in which an image obtained by combining the virtual object G1210 with the input image is shown. Furthermore, G1230 denotes an example in which an evaluation value of each of the models that was calculated by the learning model selection unit 120 is shown. Here, examples are shown in which models of a person serving as CG images are superimposed on the bed of the input image, and also CG images of the sizes of the bed obtained based on third geometric information are superimposed. The user can here check whether or not the input image and the CG images are fitted to each other.

Specifically, it is possible to determine whether or not the learning model selected by the learning model selection unit 120 is appropriate, in view of whether or not the scale of the bed and the CG image match each other, whether or not the size of the bed matches the actual scale, or whether or not the CG image is appropriately oriented with respect to the bed face.

G1310 in the window G130 denotes an example of a reproduction result of the three-dimensional shape of the scene in which the input image was captured based on the geometric information estimated by the geometric information estimation unit 140. The user can determine whether or not the learning model selected by the learning model selection unit 120 is appropriate by checking whether or not the shown three-dimensional shape is distorted, or the depth scale is different from the actual scale.

Processing

The procedure of the entire processing of Embodiment 7 is the same as in FIG. 4 showing the processing procedure of the information processing apparatus 1 described in Embodiment 1, and thus a description thereof is omitted. Embodiment 7 differs from Embodiment 1 in the procedure in which the display information generation unit 12 generates the display information.

In step S170, the display information generation unit 12 renders the information lists that characterize the learning models in the window G110 of the display unit 13. Specifically, the display information generation unit 12 renders the training images G1131 used in training of the learning models held by the learning model group holding unit 130, the position information lists G1110, and the object information lists G1120 at predetermined positions, to generate the display information. Furthermore, CG images of the virtual object are combined with the input image based on the geometric information estimated by the geometric information estimation unit 140.

Specifically, first, plane fitting is used together with the RANSAC method based on a depth map, which is geometric information, to obtain a principal plane. Then, the normal direction of the principal plane is calculated. Lastly, the CG image of the virtual object is rendered at a predetermined position (for example, in G120) on the principal plane, and the display information is generated. Note that as described with reference to G1210, the distance between two arbitrary points on the depth map may be rendered. Furthermore, the result obtained by reproducing the three-dimensional shape of the scene of the captured input image that was calculated based on the geometric information estimated by the geometric information estimation unit 140 is rendered at a predetermined position (for example, in G130), and the display information is generated. Specifically, a projection image in which the pixels of the input image are projected onto any virtual camera based on the depth values of the pixels of the depth map is generated, and is added to the display information. The display unit 13 shows, on the display, the display information thus generated.

Effects

As described above, in Embodiment 7, information that characterizes learning models, combined images in each of which a CG image of a virtual object is combined, geometric information output by the learning models, and the three-dimensional shape reproduced based on the geometric information are displayed. Accordingly, a user can check the degree of fit when each learning model is used in the scene of an input image, or a user can check whether or not an appropriate learning model could be selected. Furthermore, if an inappropriate learning model is selected, the processing can be performed again to perform selection of an appropriate learning model again, making it possible to accurately obtain position and orientation.

Modification

Embodiment 7 has described a configuration in which display information obtained by rendering information that characterizes learning models, a combined image in each of which a CG image of a virtual object is combined, geometric information output by the learning models, and the three-dimensional shapes reproduced based on the geometric information is displayed. However, all of the three types of display information do not need to be displayed, and a configuration is also possible in which at least one of the types of information is displayed.

The learning model selection unit 120 may also select a learning model based on input information that a user has input based on the display information using the input unit such as a mouse or a keyboard. In FIG. 9, G1420 denotes a radio button, and G1430 denotes an input button. The user presses down the input button to input the use of the model whose radio button has been checked to the information processing apparatus. With such a configuration, it is possible for a user to select a learning model with reference to the information that characterizes the learning models, and allow the selected learning model to accurately calculate geometric information based on the scene of the captured input image. Accordingly, it is possible to accurately obtain position and orientation. Furthermore, the user can correct the selection result if it is determined that an automatically selected learning model is inappropriate.

Embodiment 8

In Embodiments 1 to 5, a learning model is selected only once at the beginning. However, it is difficult to deal with such a case that, for example, a user has moved while experiencing mixed reality, and the scene of an input image has changed. Accordingly, Embodiment 8 will describe an example in which, even once a learning model has been selected, evaluation values of learning models are recalculated.

Configuration of Information Processing Apparatus

The configuration of the information processing apparatus in Embodiment 8 is the same as in FIG. 1 showing the configuration of the information processing apparatus 1 described in Embodiment 1, and thus a description thereof is omitted. Embodiment 8 differs from Embodiment 1 in that the geometric information estimation unit 140 calculates second geometric information based on an input image and outputs the calculated second geometric information to the learning model selection unit 120, and that the learning model selection unit 120 recalculates evaluation values of learning models.

The geometric information estimation unit 140 further calculates third geometric information based on the learning models held by the learning model group holding unit 130, and an input image input through the image input unit 110. Furthermore, the geometric information estimation unit 140 calculates second geometric information based on input images through motion stereo, and outputs the calculated second geometric information to the learning model selection unit 120.

The learning model selection unit 120 calculates evaluation values of the learning models held by the learning model group holding unit 130, based on the third geometric information and the second geometric information that were input by the geometric information estimation unit 140. Then, the evaluation results are output to the geometric information estimation unit 140.

Processing

The procedure of the entire processing of Embodiment 8 is the same as in FIG. 4 showing the processing procedure of the information processing apparatus 1 described in Embodiment 1, and thus a description thereof is omitted. Processing different from that in Embodiment 1 is that, even after a learning model has selected once in step S140, evaluation values of the learning models are recalculated and a learning model is reselected, and that the geometric information estimation unit 140 calculates the second geometric information in step S150.

In details of the processing in step S140 of the present embodiment, the processing of step S1110 in FIG. 5 is omitted. That is, irrespective of whether or not the learning model has been determined, the learning model selection unit 120 calculates evaluation values of the learning models.

In step S150 in FIG. 4, the geometric information estimation unit 140 estimates third depth maps, which are the third geometric information, using the learning models. Furthermore, the geometric information estimation unit 140 calculates second geometric information based on the input images through motion stereo.

Furthermore, in step S150 according to the present embodiment, the learning model selection unit 120 recalculates evaluation value of the learning models, based on the third geometric information and the second geometric information that were obtained by the geometric information estimation unit 140. Specifically, the learning model selection unit 120 recalculates, as the evaluation value of each learning model, an inverse number of the sum of differences in depth between the third depth map, which is the third geometric information, estimated (updated) by the geometric information estimation unit 140 at an arbitrary time t', and the second geometric information estimated (updated) by the geometric information estimation unit 140 at the same time t', the time t' being a point in time after the time t at which the input image used in calculation of evaluation values of the learning models in step S1120 in FIG. 5 was captured. Then, the learning model selection unit 120 newly selects the learning model that has the largest evaluation value.

Effects

In Embodiment 8, even once a learning model has been selected, evaluation values of the learning models are again calculated, and a new learning model is selected again. Accordingly, if a user has moved while experiencing mixed reality, and the scene of the input image has changed, the learning models can be evaluated again. By selecting a new learning model that has a high re-evaluation result, this learning model can accurately calculate geometric information in the scene of the current input image, and thus it is possible to accurately obtain the position and orientation of the image capturing apparatus.

Modification

Note that evaluation values of the learning models may be recalculated at any timing. In other words, it is also possible to perform recalculation at predetermined time intervals, or at a timing at which a key frame is added as described in K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017. Furthermore, recalculation is also possible when the result of position and orientation obtainment indicates that the image capturing apparatus 11 has moved by a predetermined movement amount or more. Furthermore, recalculation may be performed when the evaluation value of the selected learning model is reduced, or is lower than a predetermined threshold. Also, recalculation may be performed when the scene or the object type of the input image has changed, or the position information has changed (for example, when a new WiFi access point is found, or the GPS position information has changed). A configuration is also possible in which recalculation is performed when a predetermined time period has elapsed, or the weather has changed.

In Embodiment 8, the geometric information estimation unit 140 calculates second geometric information through motion stereo. However, the second geometric information may be integrated in a time series manner so as to be improved in its accuracy, and then are used for evaluation of the learning models. For example, using third geometric information estimated by the geometric information estimation unit 140 at the time t' as an initial value, second geometric information is calculated through time-series filtering based on the input image up to an arbitrary time t'+i (described in K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017). Furthermore, a plurality of depth maps calculated at a plurality of time t' in such a manner are integrated to calculate the second depth map. In this context, "integration" refers to the method descried in J. Engel, T. Schöps, and D. Cremers, "LSD-SLAM: Large-Scale Direct Monocular SLAM," In European Conference on Computer Vision (ECCV), 2014, in which the positions and orientations of the camera at a plurality of time t' at which input images used in generation of the depth maps were captured are calculated by pose graph optimization, and the obtained position and orientation of the camera are used to smooth the plurality of second depth maps. Also, a configuration is possible in which, using residuals at the time of the pose graph optimization as evaluation values, a learning model that has the smallest residual may be selected, or using the process time taken for the pose graph optimization as evaluation values, the learning model that has the shortest process time may be selected. With this measure, with the optimization advances, more accurate evaluation values can be calculated, and thus a learning model that is more appropriate can be selected, making it possible to improve the accuracy in obtaining position and orientation.

In Embodiment 8, the learning model selection unit 120 recalculates evaluation values of the models by comparing the second depth maps, which are the second geometric information, calculated by the geometric information estimation unit 140, with the third depth maps output by the learning models. However, the learning model selection method is not limited to this, and evaluation values of the learning models may be recalculated based on the input image at the time t' using the methods described in Embodiments 1 to 7.

In Embodiment 8, the learning model selection unit 120 recalculates evaluation values of the models by comparing the second depth maps, which are the second geometric information, calculated by the geometric information estimation unit 140, with the third depth maps output by the learning models. However, a configuration is also possible in which the higher the degree of match between the third geometric information and the second geometric information at a plurality of time t' is, the higher is the evaluation value that is given is, and a learning model may be selected based on the evaluation values. Specifically, the learning model selection unit 120 calculates first evaluation values, which are the sum of differences in depth value between the third depth map and the second depth map at a plurality of time t'. Then, an inverse number of an average value, a median value, a maximum value, a minimum value, or a sum of the first evaluation values is calculated as the second evaluation value, and the learning model that has the largest second evaluation value is selected. Accordingly, it is possible to select a learning model that can accurately calculate the third geometric information of input images captured at a plurality of points in time. Accordingly, even if a wrong learning model is selected first, the learning model selection unit 120 can gradually select the learning model that can accurately estimate the geometric information, and it is possible to accurately obtain position and orientation.

When evaluation values are recalculated, a learning model to be selected by the learning model selection unit 120 may be changed. At this time, the learning model that the geometric information estimation unit 140 uses to estimate the geometric information is changed, and thus the output from the learning model may largely change between before and after the change. In order to address this, in step S150, the geometric information estimation unit 140 may calculate, as the third geometric information, a weighted sum of geometric information output by two learning models during a predetermined time period. Specifically, the depth map is corrected using the following formula, where N is a predetermined frame number indicating the period in which the model is changed, and a is the number of frames that are passed through from the start of change.

[Formula 5]

$$D = \frac{(N-\alpha)D_1}{N} + \frac{\alpha D_2}{N} \quad (5)$$

Note that $D_1$ is a depth map output from a learning model before the change, $D_2$ is a depth map output from a learning model after the change, and D is a corrected depth map.

Embodiment 9

Embodiments 1 to 8 have described the methods for selecting, from a plurality of learning models generated in advance, a learning model that can estimate geometric information accurately in a scene to which the information processing apparatus is applied. The present embodiment will describe a method for generating a learning model that is to be used by the information processing apparatus, based on an RGB image and a depth map that were obtained by a depth sensor, which is a second image capturing apparatus 91. Specifically, the present embodiment will describe a method for recognizing the type of scene from the RGB image captured by the second image capturing apparatus 91, and generating a learning model according to the type. Note that, in the present embodiment, the second image capturing apparatus 91 refers to a TOF sensor, and can obtain an RGB image and a depth map.

Configuration of Information Processing Apparatus

Figure 12:
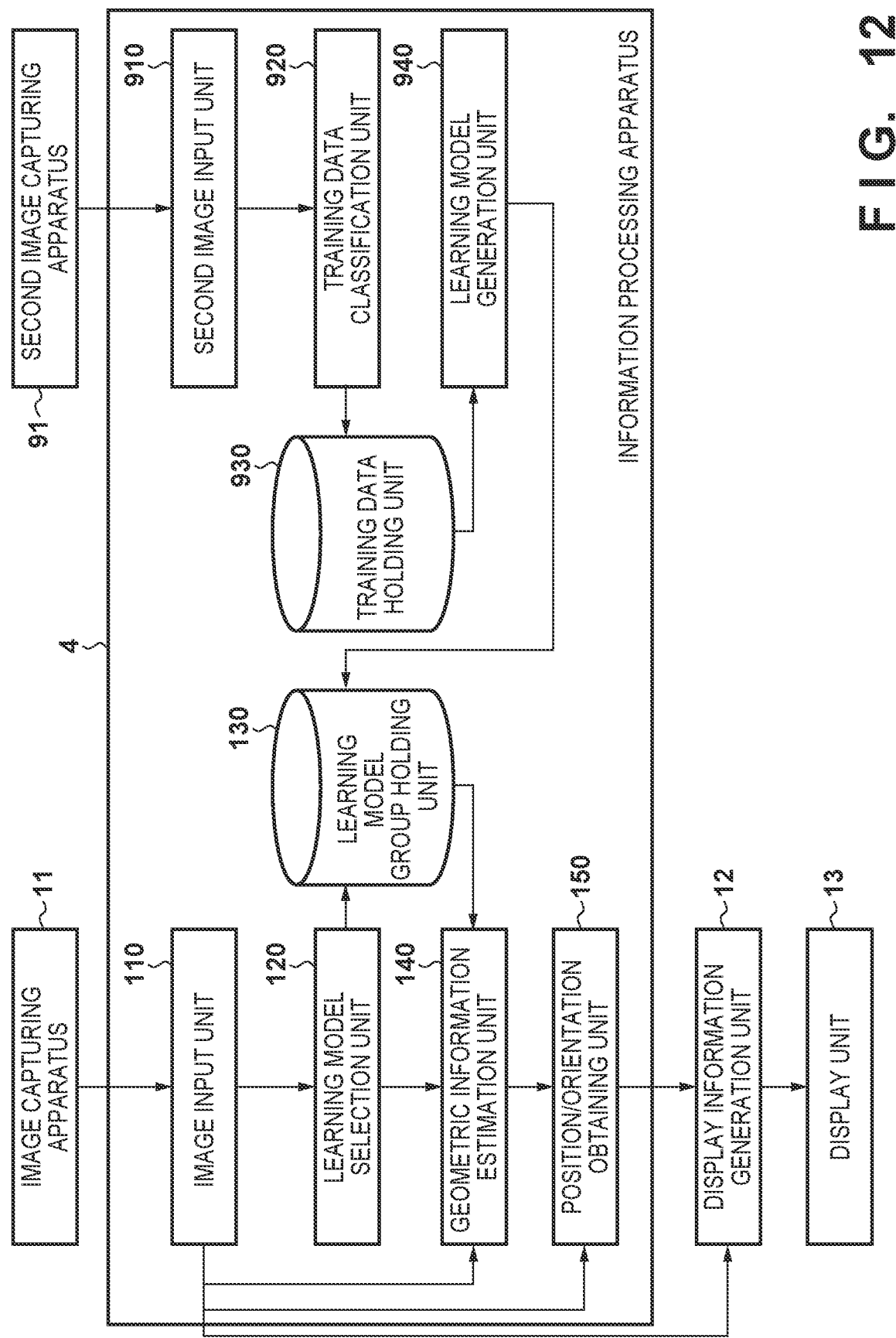
FIG. 12 is a diagram illustrating a functional configuration of an information processing apparatus 4 according to Embodiment 9.

First, a configuration of an information processing apparatus 4 according to Embodiment 9 will be described with reference to FIG. 12. Embodiment 9 differs from Embodiment 1 in that the configuration of the information processing apparatus 4 in Embodiment 9 is provided with, in addition to the configuration of the information processing apparatus 1 described in Embodiment 1, a second image input unit 910, a training data classification unit 920, a training data holding unit 930, and learning model generation unit 940. The second image input unit 910 is connected to a second image capturing apparatus 91.

The second image input unit 910 receives image data (hereinafter referred to as "model training images") and depth maps (hereinafter referred to as "model training depth maps") of two-dimensional images of scenes captured by the second image capturing apparatus 91 in a time series manner (for example, 60 frames per second), and outputs them to the training data classification unit 920. Note that model training images and model training depth maps are collectively referred to as "training data".

The training data classification unit 920 recognizes the type of the scenes based on the training data input using the second image input unit 910, classifies the training data according to the types, and outputs the classified training data to the training data holding unit 930. Note that the training data classification method will be described later.

The training data holding unit 930 holds the training data classified by the training data classification unit 920 according to the types of scenes. The training data holding unit 930 is, for example, a Solid State Drive (SSD). Folders are provided for the respective types of scenes, and the training data is held in the folder that corresponds to the result of the classification made by the training data classification unit 920. Note that it is assumed that a common ID (for example, sequential numbers or time) is assigned to a model training image and a model training depth map obtained at the same time, and are associated with each other.

The learning model generation unit 940 generates learning models using the training data stored in the training data holding unit 930 based on the results of the classification made by the training data classification unit 920. The generated learning models are output to the learning model group holding unit 130.

Figure 13A:
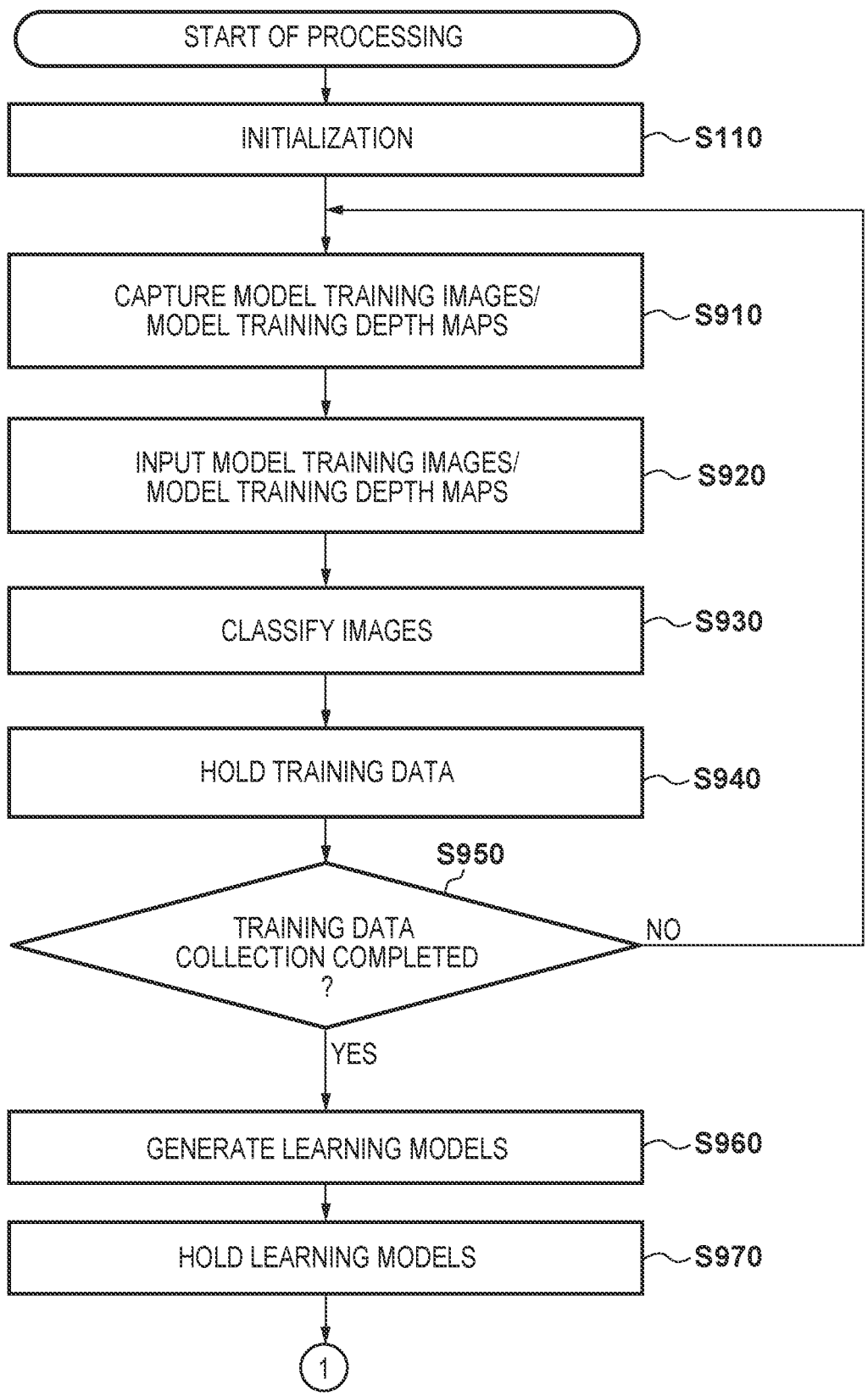
FIGS. 13A and 13B are a diagram illustrating a flowchart illustrating a processing procedure of Embodiment 9.
Figure 13B:
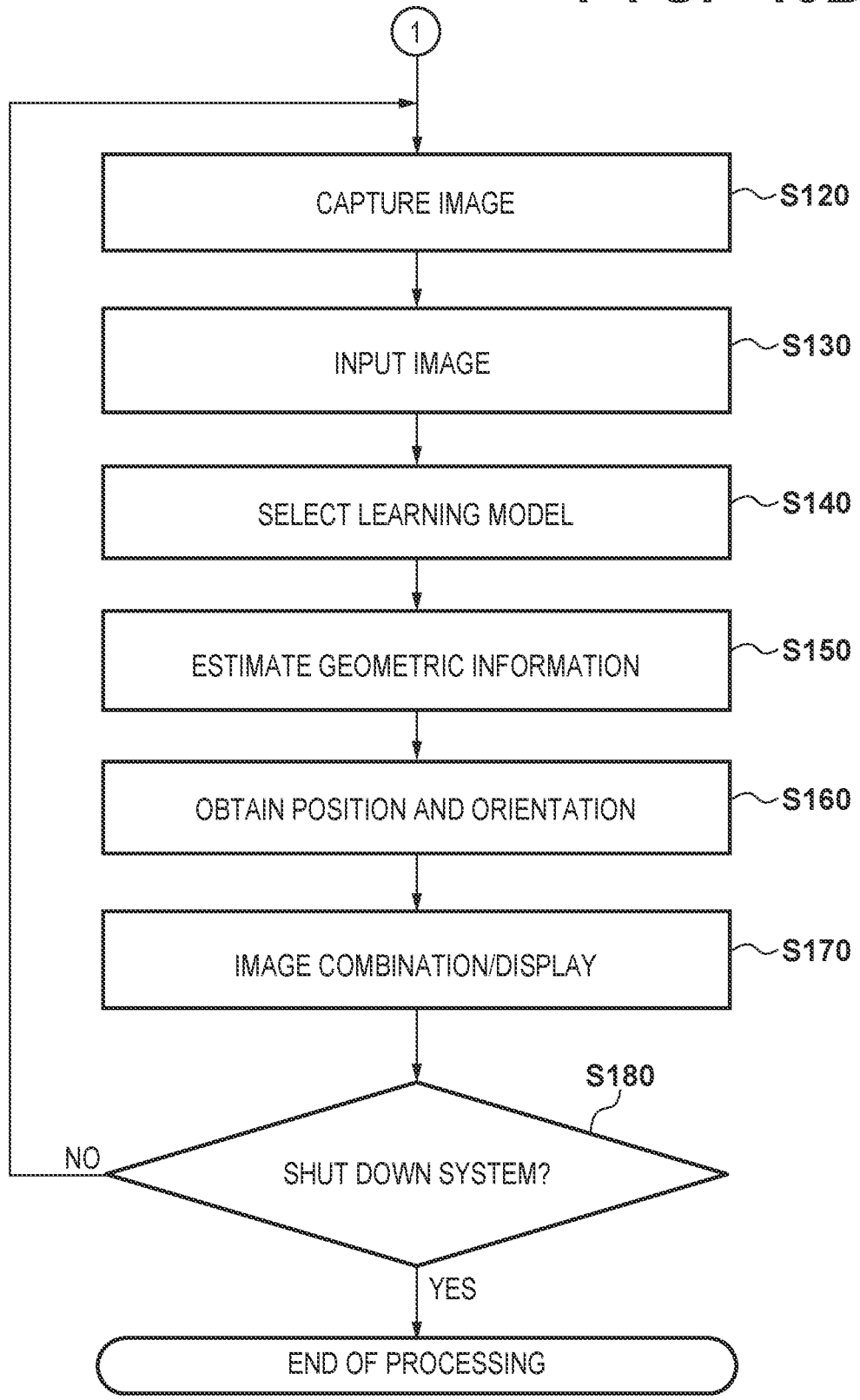

Then, a processing procedure of the present embodiment will be described with reference to a flowchart of FIGS. 13A and 13B. The present embodiment differs from Embodiment 1 in that, in addition to the processing procedure described in Embodiment 1, step S910 of capturing model training images/model training depth maps, step S920 of inputting the model training images/model training depth maps, step S930 of classifying the images, step S940 of holding training data, step S950 of determining whether or not training data collection is complete, step S960 of generating learning models, and step S970 of holding the learning models are added.

In the present embodiment, first, initialization step S110 described in Embodiment 1 is executed, and the system is initialized. Then, later-described steps S910 to S970 are executed, and learning models are generated. Then, the processing from steps S120 onward described in Embodiment 1 is executed, and the position and orientation of the image capturing apparatus 11 are calculated.

In step S910, the second image capturing apparatus 91 shoots scenes, and outputs RGB images and depth maps to the second image input unit 920. Then, the procedure moves to step S920.

In step S920, the second image input unit 910 obtains the images and the depth maps captured by the second image capturing apparatus 91 as model training images and model training depth maps. Then, the procedure moves to step S930.

In step S930, the training data classification unit 920 recognizes the types of the scenes based on the model training images, and classifies the training data. In the present embodiment, the scene determination learning model described in the modification of Embodiment 1 is used. The scene determination learning model refers to a neural network that is trained in advance using Deep Learning so as to output 1 if the input image falls under this category, and otherwise output 0. In other words, a model training image is input to the scene determination learning model to obtain a category, and the obtained category is determined as a result of the training data classification. Then, the procedure moves to step S940.

In step S940, the training data classification unit 920 holds the training data in the training data holding unit 930 based on the results of the training data classification in step S920. Specifically, the model training images and the model training depth maps are stored in the folders that correspond to the classification results. Then, the procedure moves to step S950.

In step S950, it is determined whether or not the training data collection is complete. Here, if a completion command has been input by a user through a not-shown input device, it is determined that the data collection is complete. If it is determined that the data collection is complete, the procedure moves to step S960. Otherwise, the procedure moves to step S910, and the data collection is continued.

In step S960, the learning model generation unit 940 uses the training data held by the training data holding unit 930 to generate a learning model for each of the categories classified by the training data classification unit 920. In other words, a learning model is generated for each folder of the training data holding unit 930. Specifically, a training image is selected from a folder based on a random number, and a learning model is trained repeatedly so that an error between geometric information output by the learning model using the selected training image as an input, and the learning depth map that corresponds to the selected training image is minimized. Note that the learning model generation method is described in detail in K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017, which can be taken as reference.

The learning model generation unit 940 stores the learning models generated for the respective categories classified by the training data classification unit 920 in the learning model group holding unit 130. Here, also the training images are copied and held in the learning model group holding unit 130.

Effects

As described above, in Embodiment 9, model training images and model training depth maps are classified based on determination results of scenes of the model training images, and learning models are generated for the respective types of the scenes. In this way, learning models are generated according to the respective types of scenes, and when position and orientation are calculated as described in Embodiment 1, the learning model that has the same type of scene as that of a captured image is used, and thereby it is possible to accurately calculate the position and orientation of the image capturing apparatus.

Modification

In Embodiment 9, the scene determination learning model is used to determine the scene of a model training image. However, any model may be used as long as it determines the type of scene of the model training image. That is, as described in Embodiment 1, for each type of scene, an identification boundary between feature spaces of GLC features is calculated in advance using an SVN, and the type of scene may be determined based on the result of determination as to which category a GLC feature detected from the model training image is located in. A configuration is also possible in which a colored histogram is generated in advance for each type of scene, and a model training image is classified to the type of scene that has the most matching colored histogram.

In Embodiment 9, training data is classified based on the scenes of model training images, and learning model are generated. On the other hand, a configuration is also possible in which training data is classified based on the types of object included in model training images, and learning models are generated. In other words, it is possible to classify training data into detection results of objects such as "desk", "table", "car", and "traffic light". Note that the object detection method exemplified in Embodiment 2 may also be used for object detection from a training image. A learning model is generated for each of the types of training data classified in this manner. Furthermore, a configuration is also possible in which co-occurrence probabilities of objects are calculated in advance, and training data may be classified based on them. "Co-occurrence probability" refers to the probability of objects being observed at the same time, such as for example, the probability of "short-legged table", "television", and "bed" being observed at the same time, or the probability of "desk", "chair", "personal computer", and "display" being observed at the same time. If the probability of objects being observed at the same time is used, classification of training data according to the scene is possible, for example, a scene in which "short-legged table", "television", and "bed" are observed indicates a Japanese-style house, and a scene in which "desk", "chair", "personal computer", and "display" are observed indicates an office, although no explicit scene detection was made.

It is also possible to classify training data using position information on the position at which the training data was obtained. "Position information" refers to, as described in Embodiment 3, coordinate values of latitude and longitude, or the identification ID of a Wi-Fi access point, for example. Specifically, training data may be classified by dividing the latitude and longitude at predetermined distances. Furthermore, training data may be classified according to the identification ID of the Wi-Fi access point observed when the training data was obtained. Alternatively, position information calculated from the GPS may be used to identify categories such as a country, region, sea, mountain, and road based on a not-shown map information, and training data may be classified according to the categories. Learning models are generated according to the respective types of training data thus classified.

It is also possible to classify training data according to a status that may change the view of an image such as date, season, or weather at which the training data was obtained. For example, training data may be classified according to the shooting time. Also, the shooting time is divided into categories such as morning, daytime, evening, and night, and training data may be classified according to the categories. Training data may also be classified according to the date at which shooting was performed, or the date may be separated into seasons such as spring, summer, autumn, and winter, and training data may be classified. Training data may also be classified according to weather categories such as clear weather, cloudiness, rainy weather, and snowy weather obtained from a Web site that distributes weather reports through a network via the I/F (H17). Learning models are generated according to the respective types of training data thus classified.

It is also possible to classify training data based on model training depth maps. For example, training data may also be classified based on an average value, a maximum value, a minimum value, a median value, or a dispersion value of depth values of the model training depth maps. Training data may also be classified based on the degree of evenness of the model training depth maps. For the determination of the degree of evenness, for example, a principal plane is calculated by subjecting a model training depth map to plane fitting, and the number of three-dimensional points may be used that are calculated from the depth map located at a predetermined distance from the principal plane. Furthermore, a normal line is calculated for each pixel of the model training depth map, and labeling is performed such that the same label is added to the pixels in which the inner product of the normals of the surrounding pixels is equal to or smaller than a predetermined distance, and the number of labeling results may be used as the degree of evenness.

It is also possible that a user can use a not-shown input means to input scenes, objects, position information, and the like that have been described, and training data is classified based thereon. Furthermore, training data may be classified according to the purposes of usages of learning models. In other words, a user can input the types of usage such as usage of a learning model for estimating the position and orientation of an on-board camera, e.g., automated driving, or a usage of determining the position and orientation of a camera for superimposing a CG on a smartphone or a tablet, and training data may be classified according to the input result (type of usage). Learning models are generated according to the respective types of training data thus classified.

If the second image capturing apparatus 91 is installed on a device such as an automobile that is provided with a car-navigation system, and obtains training data, training data may be classified using the type of scene (urban area, mountain area, seaside area, inside of a tunnel, or highway) associated with map information of the car-navigation system as a scene determination result. A configuration is also possible in which persons or automobiles on a road, traffic lights, signs and the number or frequency thereof, road statuses (the number of cars, the road surface: asphalt or earth) are acquired from a camera installed in the automobile, and are used as object information, and training data is classified. Information on the address at which automobiles are driving and that are calculated by the car-navigation system, information on the region name recognized based on a traffic sign captured by the camera installed in the automobile, and sensor information acquired from GPS, WiFi, or various types of beacon may be obtained, and training data may be classified based on the position information obtained therefrom. Training data may also be classified based on time information obtained from the car-navigation system, information as to whether or not a light is turned on (that can be used to determine it is daytime/night) or whether or not a windshield wiper is operated (that can be used to determine weather is fine/rain). Training data may also be classified based on the automobile type, and the installation position and the installation orientation of the camera in the automobile. Based on such classification results, it is possible to generate learning models for the respective types of classification.

Alternatively, training data may be classified according to the sequence of obtaining training data. In other words, a sequence refers to a period from the start to the end of operation of the information processing apparatus 4, and data obtained during this sequence is classified as being in the same category. It is also possible to generate learning models in this manner.

The classification methods that have been described are merely examples, and any classification method may be used as long as it can generate learning models that can accurately estimate geometric information. The foregoing classification methods may be used separately, or a combination of an arbitrary number of methods may also be used.

In Embodiment 9, immediately after the second image capturing apparatus 91 has captured an image, the training data classification unit 920 classifies the training data and stores the classified data in the training data holding unit 930. However, a configuration is also possible in which the second image capturing apparatus 91 has captured and accumulated model training images and model training depth maps in advance, and the training data classification unit 920 classifies the training data later. Generally, image recognition and training of learning models take high computational cost. Accordingly, such a configuration allows hardware that has small computational resources to obtain training data in advance, and image recognition and training of learning models can be processed by hardware that has large resources.

Also, with such a configuration, training data individually shot by a plurality of second image capturing apparatuses 91 may be used in combination, or another piece of training data may be added to training data once obtained. Furthermore, as described in Embodiment 8, obtained second geometric information is used as depth maps, and may be combined with an image captured by the image capturing apparatus 11 to serve as training data. Furthermore, using training data to which a learning model trained once is added through the above-described method, the learning model generation unit 940 can additionally train the learning model.

In Embodiment 9, the training data classification unit 920 classifies all pieces of training data captured by the second image capturing apparatus 91. However, all pieces of training data do not need to be classified, and only some of the pieces of training data may be classified. For example, every every sixtieth piece of training data captured by the second image capturing apparatus 91 may be classified, and may be held by the training data holding unit 930. Furthermore, training data that is newly obtained by the data training data classification unit 920 and has a low similarity to training data held by the training data holding unit 930 may be held by the training data holding unit 930. In this context, "similarity" refers to, for example, a difference between average values, maximum values, minimum values, median values, or dispersion values of the image brightness. Furthermore, it is also possible to use a recognition likelihood when the scene of a model training image is recognized by the scene determination learning model. Specifically, this means the distance between a recognition likelihood value (value of the degree of match between scenes) immediately before the scene determination learning model calculates an output of 0 or 1 that indicates whether or not it corresponds to the scene, and a recognition likelihood value of held training data. Accordingly, by collecting data so that the number of similar training data is reduced, or collecting training data so that the degree of difference in similarity between training data is increased, the time for taking generation of learning models is reduced, making it possible to improve the accuracy in recognition of learning models.

Embodiment 9 has described a method in which, first, learning models are generated and then position and orientation are estimated using the learning models. However, different devices may be used for generation of learning models and estimation of position and orientation using the learning models. For example, a first information processing apparatus is used to generate learning models, and the generated learning models are uploaded to a cloud server via a network. Then, another second information processing apparatus loads the learning models stored in the cloud server via the network, and estimates position and orientation based on them. Furthermore, a configuration is also possible in which, when learning models are generated, a first information processing apparatus obtains training data, and uploads the obtained data to a server, and a second information processing apparatus provided on a cloud server performs the image classification step S930 and the learning model generation step S960.

In Embodiment 9, if a completion command has been input by a user, obtaining training data is ended. Any method for determining whether or not obtaining training data is complete may be used as long as training data necessary for learning can be collected. For example, the training data classification unit 920 may determine that obtaining training data is complete when a predetermined time period has elapsed, or when a predetermined number of pieces of training data has been obtained. Furthermore, when the number of pieces of training data for each category of classification exceeds a predetermined number, it is possible to determine that obtaining training data is complete. Furthermore, the learning model generation unit 940 calculates the progress of training of learning models, and when the learning has converged, it is possible to determine that obtaining training data is complete.

In the present embodiment, classification of images means to hold training data for every folder of the training data holding unit 930 based on the result of classification of learning models performed by the training data classification unit 920. However, classification does not need to be performed for every folder, and a configuration is also possible in which the training data holding unit 930 holds a list in which results of classification are recorded for every training data.

In Embodiments 1 to 5, the learning model group holding unit 130 is configured to hold, in addition to at least two learning models, object information lists, position information lists, and status information lists. These lists may also be generated by the training data classification unit 920 as needed. In other words, information necessary for Embodiments 1 to 5 can be added by performing together processing for detecting the type of object from a model training image and adding the detected type of object to the object information list, and processing for adding the obtained position information and status information to the position information lists and the status information lists. Furthermore, if no training image is needed when a learning model is selected, the processing described in Embodiment 9 for copying and holding training images in the learning model group holding unit may be omitted.

The second image capturing apparatus 91 is not limited to a TOF sensor, and any image capturing apparatus may be used as long as it can obtain an image and a depth map. Specifically, the second image capturing apparatus 91 may be a depth camera, which projects a pattern to estimate the depth. Alternatively, a stereo camera may be used that has a stereo camera configuration having two cameras that are lined up, and is configured to calculate the depth using stereo matching, and output it as a depth map. Furthermore, 3DLiDAR (Light Detection and Ranging) may be combined with a camera, so as to output a depth map obtained by converting the depth value obtained by the LiDAR into image coordinates. Furthermore, an image is not limited to an RGB image and may be a grayscale image. Furthermore, a configuration is also possible in which the second image capturing apparatus 91 obtains in advance an image and a depth map, stores them in not-shown recording devices, and the second input unit 910 inputs the image and the depth map from the recording devices.

Effects of Embodiments

In Embodiment 1, evaluation values are given to all of a plurality of learning models, and the learning model that has the highest evaluation value is selected. At this time, the similarities between an input image and training images used in training of the respective learning models are calculated, and evaluation values of the learning models are calculated such that the higher the similarity is, the higher the evaluation value is. Then, the learning model that has the highest evaluation value is used to estimate geometric information, and based thereon, the position and orientation of the image capturing apparatus are calculated. By selecting a learning model whose training image is similar to the input image in this way, the learning model can accurately estimate geometric information, and it is possible to calculate the position and orientation of the image capturing apparatus accurately.

Furthermore, by selecting and using small learning models trained with individual scenes, estimation of geometric information is possible also in a calculating machine having a small memory capacity. Accordingly, also in a mobile terminal, it is possible to calculate the position and orientation of the image capturing apparatus.

Furthermore, by selecting and using small learning models trained with individual scenes, estimation of geometric information is possible in a shorter execution time compared to a case where a large learning model is used. Accordingly, it is possible to calculate the position and orientation of the image capturing apparatus in a short time period.

In Embodiment 2, information on objects detected from an input image is compared with information on objects detected from training images used in training of learning models, and evaluation values of the learning models are calculated such that, the larger the number of the same type of object that are included is, the higher the evaluation value that is given to a learning model is. Then, the learning model having the highest evaluation value is used to estimate geometric information, and based thereon, the position and orientation of the image capturing apparatus are calculated. Accordingly, it is possible to select a learning model whose training image includes the same type of objects as that in the input image, and allow the learning model to accurately estimate geometric information, making it possible to accurately obtain the position and orientation of the image capturing apparatus.

In Embodiment 3, evaluation values of learning models are calculated such that, the higher the degree of match between position information relating to the position at which the input image was shot, and position information relating to the position at which a training image used in training of the learning model was shot is, the higher the evaluation value is. Accordingly, it is possible to select a learning model whose information relating to the position at which a training image was shot matches that of the input image, and thus allow the learning model to accurately estimate geometric information, making it possible to calculate the position and orientation of the image capturing apparatus accurately.

In Embodiment 4, the higher the degree of match between status information on the statuses that may change the view of an input image and a training image used in training of a learning model is, the higher the evaluation value that is given to a learning model is. Accordingly, it is possible to select a learning model whose training image has a shooting status that matches that of the input image, and allow the learning model to accurately estimate geometric information, making it possible to accurately calculate the position and orientation of the image capturing apparatus.

In Embodiment 5, evaluation values of learning models are calculated such that, the higher the similarity between an input image and a training image, the degree of match between the types of object detected from the input image and the training image, and the degree of match between information on the positions at which the input image and the training image were shot are, the higher the evaluation value is. More specifically, selected is a learning model whose training image is similar to the input image, whose training image includes the same type of objects as that in the input image, and whose training image were shot at the same position as the input image. Accordingly, the learning model can accurately estimate geometric information, making it possible to accurately calculate the position and orientation of the image capturing apparatus.

In Embodiment 6, the geometric information estimation unit 140 calculates evaluation values of the learning models such that, the higher the degree of match between third geometric information estimated used a learning model and second geometric information estimated based on input images through motion stereo, the higher the evaluation value is. Accordingly, it is possible to select a learning model that can output the third geometric information similar to the second geometric information estimated through motion stereo, making it possible to accurately calculate the position and orientation of the image capturing apparatus.

Furthermore, also when the learning model trained with training images of a plurality of scenes, or no information characterizing this learning model is held, it is possible to select a learning model that can output geometric information accurately. Accordingly, it is possible to accurately calculate the position and orientation of the image capturing apparatus.

In Embodiment 7, information that characterizes learning models, combined images in each of which a CG image of a virtual object is combined, geometric information output by the learning models, and the three-dimensional shapes reproduced based on the geometric information are displayed. Accordingly, a user can visually check the suitability of each learning model to the scene of an input image, or whether or not an appropriate learning model was selected. Furthermore, the user can also select a learning model based on the display information. Furthermore, if a wrong learning model has been selected, the user can determine to perform the processing again, so that it is possible to select again an appropriate learning model. Accordingly, it is possible to accurately calculate position and orientation.

In Embodiment 8, even once a learning model has been selected, evaluation values of learning models can be calculated again, and a learning model can be selected again. Accordingly, for example, even if a user has moved while experiencing mixed reality, and the scene of an input image has changed, the learning models can be evaluated again. By selecting a new learning model that has a high re-evaluation result, the learning model can calculate geometric information accurately in the scene of the current input image, and thus it is possible to obtain the position and orientation of the image capturing apparatus accurately.

In Embodiment 9, model training images and model training depth maps are classified based on the determination results of the scenes of the model training image, and learning models are generated for the respective types of scenes. By generating, in this way, learning models for the respective types of scenes, and using the learning model that has the same type of scene as that of a captured image when position and orientation are calculated as described in Embodiment 1, it is possible to accurately calculate the position and orientation of the image capturing apparatus.

Definition

The "image input units" of the present invention may be of any type as long as they each input an image in which a real space is captured. For example, an image captured by a camera for capturing a grayscale image may be input, or an image captured by a camera for inputting an RGB image may be input. An image captured by a camera for capturing depth information, a range image, or three-dimensional point group data may be input. Furthermore, an image captured by a monocular camera, or a composite camera with two or more cameras and sensors may be input. Furthermore, an image captured by a camera may be input directly or via a network.

"Learning models" of the present invention may be of any type as long as they each output geometric information upon input of a camera image. For example, a learning model is a neural network or a CNN (Convolutional Neural Network) that is trained in advance so as to output geometric information upon input of a camera image. Furthermore, geometric information estimated by a learning model is a depth map, which is depth information estimated for each pixel of an input image, for example. Note that the geometric information estimated by a learning model may be a learning model that calculates, as geometric information, a remark point for use in obtaining position and orientation from an input image. Alternatively, the geometric information estimated by a learning model may be a learning model trained so as to estimate, upon input of two images of a previous frame and a current frame, six degrees of freedom in the position and orientation of the two images, as geometric information.

The learning model group holding unit may be of any type as long as it holds at least two (a plurality of) learning models. Furthermore, the learning model group holding unit may also hold, in addition to learning models, information lists that characterize the learning models that are held. The information that characterizes a learning model refers to information for calculating an evaluation value indicating the suitability of the learning model to the scene of an input image. Specifically, the information list that characterizes a learning model refers to an object information list including objects captured in training image used in training of the learning model, a position information list including the position at which the training image was shot, or a status information list including the status that may change the view of the image such as date, season, weather at which the training image was shot. Furthermore, internal parameters of a camera that has captured the training images may also be held according to the learning models.

The learning model selection unit may be of any type as long as it adds evaluation values to the learning models held by the learning model group holding unit. In this context, "evaluation value" is an index that indicates the suitability of the corresponding learning model to a scene captured by the image capturing apparatus. Specifically, an evaluation value is the similarity between an input image and a training image, or the degree of match between types of object detected from the images or between information on the positions at which the images were shot.

The method for calculating evaluation values is not limited to the above-described methods, and each evaluation value may be calculated based on the degree of approximation between geometric information output by a learning model and geometric information measured from an input image. Specifically, second geometric information calculated using a motion stereo method based on the input image may be compared with third geometric information output by the learning model, and an evaluation value of the learning model may be calculated.

Furthermore, the learning model selection unit may be configured to select a learning model based on evaluation values. Information lists that characterize learning models are displayed on the display of a mobile device or the like, and a learning model input by a user may be selected.

The geometric information estimation unit may be of any type as long as it inputs an input image to a learning model to calculate geometric information. In the present invention, particularly, "first geometric information" refers to an output that is obtained by the geometric information estimation unit inputting an input image to the learning model selected by the learning model selection unit, and is used for the position/orientation obtaining unit to obtain position and orientation. Furthermore, the geometric information estimation unit may estimate "third geometric information", which is an index for calculating an evaluation value by the learning model selection unit. At this time, the third geometric information refers to an output that is obtained by inputting an input image to each learning model held by the learning model group holding unit, and is used for the learning model selection unit to calculate an evaluation value of the learning model. Furthermore, the geometric information estimation unit may be configured to calculate "second geometric information" based on an input image using motion stereo.

The position/orientation obtaining unit may be of any type as long as it calculates the position and orientation of a camera based on geometric information output by the learning model. For example, pixels of a previous frame are projected onto a current frame based on geometric information output by the learning model, and position and orientation may be calculated so that differences in brightness between the pixel value of the projected pixels of the previous frame and the pixel values of the current frame are minimum. Furthermore, the present invention is not limited to the method in which the first geometric information, which is an output from the learning model, is directly used to calculate the position and orientation of the camera, and a configuration is also possible in which the geometric information estimation unit calculates geometric information obtained by integrating the second geometric information also using time-series filtering, and calculates the position and orientation of the camera based thereon.

According to the present invention, it is possible to accurately estimate geometric information.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-213226 filed Nov. 2, 2017, and No. 2018-152718, filed Aug. 14, 2018, which are hereby incorporated by reference wherein in their entirety.

What is claimed is:

1. An information processing apparatus comprising:
one or more hardware processors; and
one or more memories which store instructions executable by the one or more hardware processors to cause the information processing apparatus to perform at least:
holding a plurality of learning models, which are learned by using a captured image captured by an image capturing apparatus and depth information of the captured image as teacher data, for estimating depth information corresponding to an input image, in association with an imaging position of the captured image used as the teacher data;
selecting a learning model suitable for a scene shown in the input image from the plurality of learning models based on an evaluation result obtained from a degree of match between any one of imaging positions held in association with the learning models and an imaging position where the input image was captured; and
estimating first depth information using the input image and the selected learning model.

2. The information processing apparatus according to claim 1, wherein the instructions are executable by the one or more hardware processors to further cause the information processing apparatus to perform:
obtaining position and orientation of the image capturing apparatus based on the first depth information.

3. The information processing apparatus according to claim 2, wherein the instructions are executable by the one or more hardware processors to further cause the information processing apparatus to perform:
generating display information based on at least one of the input image, the first depth information, the depth information of the captured image held, the evaluation results, or the positions and orientation.

4. The information processing apparatus according to claim 3,
wherein in generating the display information, the instructions are executable by the one or more hardware processors to cause the information processing apparatus to perform:
generating the display information by combining, based on the first depth information, a CG image of a virtual object with the input image.

5. The information processing apparatus according to claim 3, wherein the instructions are executable by the one or more hardware processors to further cause the information processing apparatus to perform:
estimating, for each of the learning models, third depth information based on the input image and the learning model,
wherein in generating the display information, the instructions are executable by the one or more hardware processors to cause the information processing apparatus to perform:
generating the display information by combining, based on the third depth information, a CG image of a virtual object with the input image.

6. The information processing apparatus according to claim 3,
wherein in generating the display information, the instructions are executable by the one or more hardware processors to cause the information processing apparatus to perform:
generating the display information by reproducing, based on the first depth information, a three-dimensional shape of a captured scene of the input image.

7. The information processing apparatus according to claim 3, wherein the instructions are executable by the one or more hardware processors to further cause the information processing apparatus to perform:
estimating, for each of the learning models, third depth information based on the input image and the learning model, and
generating the display information by reproducing, based on the third depth information, a three-dimensional shape of a captured scene of the input image.

8. The information processing apparatus according to claim 3, further comprising:
a display unit configured to display the display information.

9. The information processing apparatus according to claim 1, wherein the instructions are executable by the one or more hardware processors to further cause the information processing apparatus to perform:
estimating second depth information from an input image, by stereo measurement method,
estimating, for each of the learning models, third depth information based on the input image and the learning model, and
calculating evaluation results of the learning models such that the higher a degree of match between the second depth information and the third depth information is, the higher the evaluation result is.

10. The information processing apparatus according to claim 9, further comprising:
a sensor configured to measure a movement amount of the image capturing apparatus, wherein the instructions are executable by the one or more hardware processors to further cause the information processing apparatus to perform:

calculating evaluation results of the learning models such that the higher the degree of match between at least one of sensor information measured by the sensor and depth information calculated based on the sensor information, and the third depth information is, the higher the evaluation result is.

11. The information processing apparatus according to claim 9, wherein the instructions are executable by the one or more hardware processors to further cause the information processing apparatus to perform:

updating the second depth information and the third depth information, based on a second input image captured at a second time, which is different from a time at which the input image was captured by the image capturing apparatus, and re-calculating evaluation results of the learning models such that the higher the degree of match between the updated second depth information and the updated third depth information is, the higher the evaluation result is.

12. The information processing apparatus according to claim 9, wherein the instructions are executable by the one or more hardware processors to further cause the information processing apparatus to perform:

estimating a plurality of pieces of second depth information and a plurality of pieces of third depth information, based on a plurality of input images captured at a plurality of points in time by the image capturing apparatus, and calculating evaluation values of the learning models such that the higher the degree of match between the plurality of pieces of second depth information and the plurality of pieces of third depth information is, the higher the evaluation result is.

13. The information processing apparatus according to claim 1, wherein the instructions are executable by the one or more hardware processors to further cause the information processing apparatus to perform:

estimating, for each of the learning models, third depth information based on the input image and the learning model, and calculating evaluation results of the learning models such that the more a size or shape of a known object detected from the input image conforms to the third depth information, the higher the evaluation result is.

14. The information processing apparatus according to claim 1, wherein the instructions are executable by the one or more hardware processors to further cause the information processing apparatus to perform:

inputting a third input image and fourth depth information obtained by a second image capturing apparatus;

classifying the third input image and the fourth depth information according to a type of scene of the third input image or the fourth depth information;

holding, based on results of the classifying, the third input image and the fourth depth information according to the type of scene; and generating the plurality of learning models for the respective types of scene by using the third input image and the fourth depth information, and storing the generated plurality of learning models.

15. A method for controlling an information processing apparatus, the method comprising:

holding a plurality of learning models, which are learned by using a captured image captured by an image capturing apparatus and depth information of the captured image as teacher data, for estimating depth information corresponding to an input image, in association with an imaging position of the captured image used as the teacher data;

selecting a learning model suitable for a scene shown in the input image from the plurality of learning models based on an evaluation result obtained from a degree of match between any one of imagining positions held in association with the learning models and an imaging position where the input image was captured; and estimating first depth information using the input image and the selected learning model.

16. A non-transitory computer-readable storage medium storing a computer program for causing a computer to execute a method for controlling an information processing apparatus, the method comprising:

holding a plurality of learning models, which are learned by using a captured image captured by an image capturing apparatus and depth information of the captured image as teacher data, for estimating depth information corresponding to an input image, in association with an imaging position of the captured image used as the teacher data;

selecting a learning model suitable for a scene shown in the input image from the plurality of learning models based on an evaluation result obtained from a degree of match between any one of imagining positions held in association with the learning models and an imagining position where the input image was captured; and estimating first depth information using the input image and the selected learning model.

* * * * *